(12) United States Patent
Kitazaki et al.

(10) Patent No.: US 8,372,774 B2
(45) Date of Patent: *Feb. 12, 2013

(54) PHOTOCATALYST-COATED BODY AND PHOTOCATALYTIC COATING LIQUID THEREFOR

(75) Inventors: Satoru Kitazaki, Kanagawa-Ken (JP); Junji Kameshima, Kanagawa-Ken (JP); Koji Omoshiki, Kanagawa-Ken (JP); Yoji Takaki, Kanagawa-Ken (JP); Yuki Tanaka, Kanagawa-Ken (JP); Hironaga Iwata, Kanagawa-Ken (JP); Makoto Hayakawa, Kanagawa-Ken (JP); Mitsuyoshi Kanno, Kanagawa-Ken (JP)

(73) Assignee: Toto Ltd., Fukuoka-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,759

(22) Filed: Feb. 15, 2012

(65) Prior Publication Data

US 2012/0142521 A1 Jun. 7, 2012

Related U.S. Application Data

(63) Continuation of application No. 12/965,487, filed on Dec. 10, 2010, now Pat. No. 8,207,079, which is a continuation of application No. 12/383,840, filed on Mar. 27, 2009, now Pat. No. 7,919,425, which is a continuation-in-part of application No. 12/079,417, filed on Mar. 26, 2008, now Pat. No. 7,977,270.

(60) Provisional application No. 61/040,151, filed on Mar. 28, 2008.

(30) Foreign Application Priority Data

| Mar. 26, 2007 | (JP) | 2007-79469 |
| May 11, 2007 | (JP) | 2007-127296 |
| Mar. 28, 2008 | (JP) | 2008-87837 |
| Mar. 28, 2008 | (JP) | 2008-87840 |
| Sep. 24, 2008 | (JP) | 2008-244432 |
| Dec. 26, 2008 | (JP) | 2008-331910 |

(51) Int. Cl.
*B01J 31/06* (2006.01)
(52) U.S. Cl. .................................................. 502/159
(58) Field of Classification Search .................. None
See application file for complete search history.

(56) References Cited

U.S. PATENT DOCUMENTS 5,616,532 A 4/1997 Heller et al.
(Continued)

FOREIGN PATENT DOCUMENTS

JP 11-140432 A 5/1999
(Continued)

OTHER PUBLICATIONS

Nissan Chemical America Corporation, Technical in formation on Snowtex 50, http:/www.nissanchem-usa.com/snowtex.php., pp. 1-9.
(Continued)

*Primary Examiner* — Melvin C Mayes
*Assistant Examiner* — Stefanie Cohen
(74) *Attorney, Agent, or Firm* — Carrier Blackman & Associates, P.C.; Joseph P. Carrier; William D. Blackman

(57) ABSTRACT

A photocatalyst-coated body comprises a substrate and a photocatalyst layer provided on the substrate, the photocatalyst layer comprising photocatalyst particles of 1 part or more by mass and less than 20 parts by mass, inorganic oxide particles of 70 parts or more by mass and less than 99 parts by mass, and the dried substance of a hydrolyzable silicone of zero parts or more by mass and less than 10 parts by mass, provided that a total amount of the photocatalyst particles, the dried substance of the inorganic oxide particles and the hydrolyzable silicone is 100 parts by mass in terms of silica. The inorganic oxide particles have a number average particle diameter ranging from 10 nm or more to less than 40 nm calculated by measuring lengths of 100 particles randomly selected from particles located within a visible field magnified 200,000 times by a scanning electron microscope.

17 Claims, 3 Drawing Sheets

U.S. PATENT DOCUMENTS

| | | |
|---|---|---|
| 6,013,372 A | 1/2000 | Hayakawa et al. |
| 6,071,606 A | 6/2000 | Yamazaki et al. |
| 6,221,498 B1 | 4/2001 | Takahama et al. |
| 6,228,480 B1 | 5/2001 | Kimura et al. |
| 6,491,883 B2 | 12/2002 | Mori et al. |
| 6,906,001 B1 | 6/2005 | Escaffre et al. |
| 2005/0277543 A1 | 12/2005 | Takahashi et al. |
| 2006/0020052 A1 | 1/2006 | Tsujimoto et al. |
| 2006/0264525 A1 | 11/2006 | Ohwaki et al. |
| 2008/0254975 A1 | 10/2008 | Kitazaki et al. |

FOREIGN PATENT DOCUMENTS

| | | |
|---|---|---|
| JP | 11-169727 A | 6/1999 |
| JP | 2001-232215 A | 8/2001 |
| JP | 2001-286766 A | 10/2001 |
| JP | 2002-053772 A | 2/2002 |
| JP | 2002-137322 A | 5/2002 |
| JP | 2004-359902 A | 12/2004 |
| JP | 2005-082637 A | 3/2005 |
| JP | 2005-179686 A | 7/2005 |
| JP | 2005-199607 A | 7/2005 |
| JP | 2006-045419 A | 2/2006 |
| JP | 2006-111680 A | 4/2006 |
| JP | 2007-055207 A | 3/2007 |
| JP | 2008-264777 A | 11/2008 |
| WO | 03/033144 A1 | 4/2003 |

OTHER PUBLICATIONS

Nihon Parkerrizing Co., Ltd., Photocatalyst Coating Material (PALTITAN Series), pp. 1-4, http://www.technopedia.jp/list/enseeds/e 093.html.

Ishihara Sangyo Co., Technological Information on STS-21, Photocatalytic Titanium Dioxide, http://www20.inetba.com/ishiharacorpusa/item416092.ctlg.

Tayca Corp Technology, Photocatalytic Titanium Dioxide, pp. 1-2, http://tayca.co.jp/english/file/04/08 03.html.

PHOTOCATALYST-COATED BODY AND PHOTOCATALYTIC COATING LIQUID THEREFOR

CROSS-REFERENCES TO RELATED APPLICATIONS

This application is a continuation of U.S. patent application Ser. No. 12/965,487 filed on 10 Dec. 2010 (now U.S. Pat. No. 8,207,079), which is a continuation of U.S. patent application Ser. No. 12/383,840 filed on Mar. 27, 2009 (now U.S. Pat. No. 7,919,425 B2), which is a continuation-in-part of U.S. patent application Ser. No. 12/079,417 filed on Mar. 26, 2008 (now U.S. Pat. No. 7,977,270 B2). The U.S. patent application Ser. No. 12/383,840 claims the benefit of U.S. Provisional Application No. 61/040,151 filed Mar. 28, 2008, and claims priorities to Japanese Patent Application No. 2008-87837 filed Mar. 28, 2008, Japanese Patent Application No. 2008-87840 filed Mar. 28, 2008, Japanese Patent Application No. 2008-244432 filed Sep. 24, 2008, and Japanese Patent Application No. 2008-331910 filed Dec. 26, 2008. The entire disclosures of these prior applications are incorporated herein by reference.

TECHNICAL FIELD

The present invention relates to a photocatalyst-coated body which is superior in weather resistance, noxious gas decomposability, and various coating properties, particularly suitable for use in exterior materials for buildings and the like. The present invention also relates to a photocatalyst coating liquid for the photocatalyst-coated body.

BACKGROUND ART

Photocatalysts such as titanium oxide have been recently utilized in various applications such as exterior materials for buildings. Employment of the photocatalyst makes it possible to harness light energy to decompose various types of noxious substances and to hydrophilize the surface of a substrate coated with the photocatalyst to allow a stain deposited on the surface to be easily washed away with water. The following techniques have been known for producing photocatalyst-coated bodies coated with such a photocatalyst.

It is known to use an aqueous dispersion comprising photocatalytic metallic oxide particles, a colloidal silica, and a surfactant to impart hydrophilic properties to the surface of a synthetic resin or the like (see, for example, Japanese Patent Laid-Open Publication No. 1999-140432). In this technique, the hydrophilic properties are intensified by adding a large amount of a surfactant ranging from 10 wt % to 25 wt %. Also, the film thickness is set at 0.4 μm or less in order to prevent white turbidity from being caused by diffuse reflection of light.

It is also known to form on the substrate a coating film comprising a photocatalytic titanium dioxide and a binder silica sol to obtain a photocatalyst body (see, for example, Japanese Patent Laid-Open No. 1999-169727). In this technique, the additive amount of the silica sol in view of $SiO_2$ is 20 parts to 200 parts by weight of the titanium dioxide, and the $TiO_2$ content ratio is high. The particle diameter of the silica sol is as small as 0.1 nm to 10 nm.

It is also known that a photocatalyst coating material is used to form a photocatalyst coating film that transmits 50% or more of light having a wavelength of 500 nm and blocks 80% or more of light having a wavelength of 320 nm (see, for example, in Japanese Patent Laid-Open No. 2004-359902).

In this technique, an organosiloxane partial hydrolysate is used as a binder of the photocatalyst coating material, in which the organosiloxane partial hydrolysate is contained preferably in an amount of 5 mass % to 40 mass % of the entire coating composition.

In the meantime, a problem has been conventionally known that, when a substrate for a photocatalyst layer is composed of an organic material, the organic material is decomposed or deteriorated due to photocatalytic activity of the photocatalyst. In order to address this problem, it is known that an adhesive layer made of a silicone-modified resin or the like is provided between a photocatalyst layer and a substrate to protect the substrate from being deteriorated by the photocatalysis (see, for example, WO97/00134).

SUMMARY OF THE INVENTION

The inventors have currently found that a photocatalyst-coated body which is superior in weather resistance, noxious gas decomposability, and various coating properties (such as ultraviolet absorptivity, transparency and film strength) can be obtained while preventing corrosion of a substrate (in particular an organic substrate), by constituting a photocatalyst layer with a specified composition that comprises photocatalyst particles and inorganic oxide particles in a specified mass ratio and minimizing a hydrolyzable silicone and a surfactant to no or a small amount.

Accordingly, it is an object of the present invention to provide a photocatalyst-coated body, which is superior in weather resistance, noxious gas decomposability, and various coating properties (such as ultraviolet absorptivity, transparency and film strength) while preventing corrosion of a substrate (in particular an organic substrate). It is also an object of the present invention to provide a photocatalyst coating liquid for the photocatalyst-coated body.

According to an aspect of the present invention, there is provided a photocatalyst-coated body comprising a substrate and a photocatalyst layer provided on the substrate, the photocatalyst layer comprising photocatalyst particles of 1 part or more by mass and less than 20 parts by mass, inorganic oxide particles of 70 parts or more by mass and less than 99 parts by mass, and a hydrolyzable silicone of zero parts or more by mass and less than 10 parts by mass, provided that a total amount of the photocatalyst particles, the inorganic oxide particles and the hydrolyzable silicone is 100 parts by mass; and wherein the inorganic oxide particles have a number average particle diameter ranging from 10 nm or more to less than 40 nm calculated by measuring lengths of 100 particles randomly selected from particles located within a visible field magnified 200,000 times by a scanning electron microscope.

According to another aspect of the present invention, there is provided a photocatalyst coating liquid used for manufacturing the photocatalyst-coated body according to the discussed aspect, comprising, in a solvent, photocatalyst particles of 1 part or more by mass and less than 20 parts by mass; inorganic oxide particles of 70 parts or more by mass and less than 99 parts by mass; and a hydrolyzable silicone of zero parts or more by mass and less than 10 parts by mass, provided that the total amount of the photocatalyst particles, the inorganic oxide particles and the hydrolyzable silicone is 100 parts by mass.

According to the present invention there is also provided a photocatalyst-coated body comprising a substrate and a photocatalyst layer provided on the substrate, the photocatalyst layer comprising: photocatalyst particles of 1 part or more by mass and less than 20 parts by mass; inorganic oxide particles of 70 parts or more by mass and less than 99 parts by mass;

and the dried substance of a hydrolyzable silicone of zero parts or more by mass and less than 10 parts by mass, provided that a total amount of the photocatalyst particles, the dried substance of the inorganic oxide particles and the hydrolyzable silicone is 100 parts by mass in terms of silica, wherein the photocatalyst layer has a film thickness of 3.0 μm or less.

Similarly according to the present invention there is provided a photocatalyst coating liquid used for manufacturing the photocatalyst-coated body according to the discussed aspect, comprising, in a solvent, photocatalyst particles of 1 part or more by mass and less than 20 parts by mass; inorganic oxide particles of 70 parts or more by mass and less than 99 parts by mass; and a hydrolyzable silicone of zero parts or more by mass and less than 10 parts by mass, provided that the total amount of the photocatalyst particles, the inorganic oxide particles and the hydrolyzable silicone is 100 parts by mass.

DETAILED DESCRIPTION OF THE INVENTION

Photocatalyst-Coated Body

Figure 1:
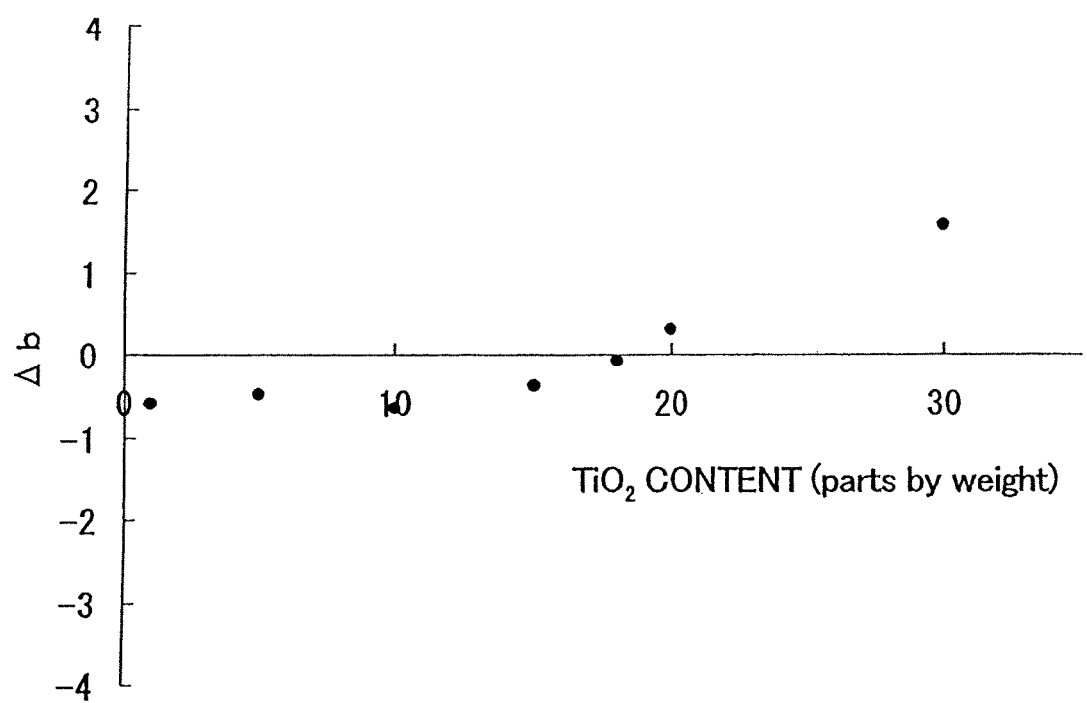
FIG. 1 is a graph showing the relationship between the values Δb being a change in color difference between before and after the accelerated test and $TiO_2$ content ratios, measured in Examples 1 to 7, in which the values of the $TiO_2$ content ratios (parts by mass) represent the proportion of the mass of the titanium oxide particles to the total amount of the titanium oxide particles and the silica particles.

The photocatalyst-coated body according to the present invention comprises a substrate and a photocatalyst layer provided on the substrate. The photocatalyst layer includes 1 part or more and less than 20 parts by mass of photocatalyst particles, 70 parts or more and less than 99 part by mass of inorganic oxide particles, zero parts or more and less than 10 parts by mass of a hydrolyzable silicone as an optional component, and zero parts or more and less than 10 parts by mass of a surfactant as an optional component. The total amount of the photocatalyst particles, the inorganic oxide particles, and the hydrolyzable silicone is 100 parts by mass, and the parts by mass of the surfactant are determined with respect to the total 100 parts by mass.

The photocatalyst layer according to the present invention basically comprises 1 part or more and less than 20 parts by mass of photocatalyst particles and 70 parts or more and less than 99 parts by mass of inorganic oxide particles. This constitution makes it possible to achieve a photocatalyst-coated body which is superior in weather resistance, noxious gas decomposability, and various coating properties (such as ultraviolet absorptivity, transparency and film strength) while preventing corrosion of a substrate (in particular an organic substrate). The reason why these effects are realized all together is not clear, but may be supposed to be as follows. The following explanation is only a hypothesis, and the present invention is not limited by the following hypothesis. First, since the photocatalyst layer basically comprises two kinds of particles, i.e., the photocatalyst particles and the inorganic oxide particles, there is a lot of space between the particles. In the case of using a large amount of a hydrolyzable silicone widely used as a binder for a photocatalyst layer, it is considered that the hydrolyzable silicone would block diffusion of the gas because the space between particles is closely filled up. However, the photocatalyst layer of the present invention is free from a hydrolyzable silicone or, in the alternative, comprises the hydrolyzable silicone of less than 10 parts by mass with respect to the total 100 parts by mass of the photocatalyst particles, the inorganic oxide particles and the hydrolyzable silicone. For this reason, it is supposed that the space between particles can be sufficiently ensured. The space thus ensured leads to realization of a structure in which noxious gases such as NOx and SOx are readily diffused into the photocatalyst layer. As a result, it is supposed that the noxious gases come into effective contact with the photocatalyst particles to be decomposed by the photocatalyst activity.

At the same time, it is considered that, since the proportion of the photocatalyst particles is quite lower than that of the inorganic oxide particles, direct contact of the photocatalyst particles with the substrate can be minimized to suppress corrosion of the substrate (in particular the organic substrate). It is also supposed that the substrate can be prevented from being damaged from ultraviolet light because the photocatalyst itself absorbs ultraviolet light to reduce the amount of ultraviolet light reaching the substrate. As a result, the photocatalyst layer of the present invention is able to be formed on a substrate of which at least the surface is composed of an organic material, by direct application without interposing an intermediate layer for protecting the substrate. Thus, since there is no necessity to form the intermediate layer, it is possible to save time and cost required for manufacturing photocatalyst-coated bodies. In addition, the photocatalyst layer of the present invention may not comprise a surfactant, but even if the photocatalyst layer comprises the surfactant, the amount of surfactant is set to less than 10 parts by mass with respect to the total 100 parts by mass of the photocatalyst particles, the inorganic oxide particles and the hydrolyzable silicone. By this setting, it is supposed to prevent deterioration in film strength and noxious gas decomposability, which is caused by a large amount of the surfactant being contained. With the above various phenomena occurring all together, it is thought to achieve a photocatalyst-coated body which is superior in weather resistance, noxious gas decomposability, and various coating properties (such as ultraviolet absorptivity, transparency and film strength) while preventing corrosion of a substrate (in particular an organic substrate).

Additionally the photocatalyst-coated body according to the present invention may be a photocatalyst-coated body comprising a substrate and a photocatalytic layer provided on the substrate, the photocatalytic layer comprising photocatalytic particles and inorganic oxide particles, and the photocatalytic layer having interstices between the particles in the layer.

By constructing the photocatalytic layer with photocatalytic particles and inorganic oxide particles as main components and positively providing interstices between the particles in the photocatalytic layer, air permeability to the photocatalytic layer is improved, while it becomes easier to allow decomposable substances such as NOx gas in outside air or gases such as oxygen and water vapor necessary to generate active oxygen to undergo an action effectively in the vicinity of the photocatalytic particles. Accordingly, gas decomposition characteristics of the photocatalyst such as excellent NOx decomposition function are obtained.

In addition to the aforementioned construction, it is preferable that the photocatalyst-coated body is constructed so that the photocatalytic layer comprises the photocatalytic particles in an amount of more than 1 part by mass and less than 5 parts by mass, the inorganic oxide particles in an amount of more than 85 parts by mass and less than 99 parts by mass, and the dried substance of the hydrolyzable silicone in an amount of 0 part by mass or more and less than 10 parts by mass, provided that the photocatalytic particles, the inorganic oxide particles, and the hydrolyzable silicone amount to 100 parts by mass in terms of silica.

That is, it is considered that considerably lower content of the photocatalytic particles than that of the inorganic oxide particles in the photocatalytic layer (preferably more than 1 part by mass and less than 5 parts by mass, more preferably 2 parts by mass or more and less than 5 parts by mass, further more preferably 2 parts by mass or more and 4.5 part by mass or less relative to the total amount of 100 parts by mass of the photocatalytic particles, inorganic oxide particles and hydrolyzable silicone) enables to minimize the direct contact of the photocatalytic particles with the substrate, making erosion of the substrate (especially the organic substrate) less likely to occur. In addition, it is considered that deterioration of the substrate by ultraviolet light can be reduced by reducing the dose of the ultraviolet light reaching the substrate since the photocatalyst itself absorbs the ultraviolet light.

At the same time, with this construction, it becomes possible to obtain a photocatalyst-coated body excellent in harmful gas decomposability and various desired coating characteristics (such as transparency and film strength), while preventing erosion of the substrate (especially the organic substrate). First of all, since the amount of the inorganic oxide particles is as large as preferably more than 85 parts by mass and less than 99 parts by mass, the photocatalytic layer is essentially composed of two types of the particles, photocatalytic particles and inorganic oxide particles, resulting in existence of plentiful interstices between the particles. If a large amount of hydrolyzable silicone which is commonly used as a binder of the photocatalytic layer is used, it is considered that the gas diffusion is hindered because such interstices between the particles are densely filled with the hydrolyzable silicone. On the other hand, since the photocatalytic layer of the present invention does not comprise the dried substance of the hydrolyzable silicone or, even if it comprises some, the content is preferably less than 10 parts by mass relative to the total amount of 100 parts by mass of the photocatalytic particles, the inorganic oxide particles, and the dried substance of the hydrolyzable silicone in terms of silica, interstices between the particles can be sufficiently maintained and secured, and thus attain a structure which facilitates diffusion of the harmful gases such as NOx and SOx into the photocatalytic layer. As a result, it is considered that the harmful gases effectively contact with the photocatalytic particles and are decomposed by the photocatalytic activity. Considering the aforementioned action and effect, it is the most preferable that the amount of the dried substance of the hydrolyzable silicone in terms of silica is substantially 0 part by mass.

In the aforementioned construction, especially the photocatalytic particles can exert photocatalytic decomposition function such as a function to decompose NOx in an amount as small as preferably more than 1 part by mass and less than 5 parts by mass. Therefore, it is considered that the photocatalyst-coated body excellent in weather resistance, hydrophilicity, harmful gas decomposability and various desired coating characteristics (such as transparency and film strength) is realized, while preventing erosion of the substrate (especially the organic substrate). Accordingly, the photocatalytic layer of the present invention can exert excellent durability even with high ultraviolet dose and under hot and humid weather conditions in tropical and subtropical regions especially at low latitudes, at the same time as the photocatalytic decomposition function.

The average particle diameter of the photocatalytic particles is preferably 10 nm or more and 100 nm or less, more preferably 10 nm or more and 60 nm or less. The average particle diameter is calculated as a number average value of the measured length of arbitrary 100 particles within a visual field of a scanning electron microscope with 200,000× magnification. Although the most preferred shape of the particle is perfect sphere, approximate circle or ellipse may be acceptable, in which case the length of the particle is approximately calculated as ((major axis+minor axis)/2). In this range, gas permeation amount in the photocatalytic layer, specific surface area for sufficient gas decomposition activity, monocrystalline size for sufficient photocatalytic activity of the particle, and various coating film characteristics such as transparency and weather resistance can be exerted in a balanced manner. Furthermore, making the average particle diameter of the photocatalytic particles 10 nm or more and 100 nm or less, more preferably 10 nm or more and 60 nm or less can be suitably combined with each of the constituent elements of the present invention described up to here, and new effects mentioned above may also be exerted without hindering the effects of the constituent elements.

As the photocatalytic particles, particles of metal oxide such as titanium oxide ($TiO_2$), ZnO, $SnO_2$, $SrTiO_3$, $WO_3$, $Bi_2O_3$, and $Fe_2O_3$ are exemplified. Any metal oxides exemplified here can be suitably combined with each constituent mentioned above.

As the photocatalytic particles, titanium oxide particles are preferable. Titanium oxide has better water resistance compared with ZnO and exerts photocatalytic function such as gas decomposition by the light of the wavelength of 380 nm to 420 nm which is included sufficiently in sunlight compared with $SnO_2$. Furthermore, microparticles of a nanometer order of titanium oxide are more easily available than $SrTiO_3$, therefore the specific surface area is large and practically sufficient photocatalytic activity is easily available. Furthermore, due to its larger bandgap compared with $WO_3$, $Bi_2O_3$, and $Fe_2O_3$, titanium oxide has a sufficient oxidation power, prevents recoupling of conductive electron and positive hole after photoexcitation, and has activation energy sufficient for gas decomposition. In addition, titanium oxide is harmless, chemically stable, and available at low cost. In addition, due to its high bandgap energy, titanium oxide needs ultraviolet light for photoexcitation and does not absorb visible light in the process of photoexcitation, resulting in no coloration by complementary color component.

Using titanium oxide particles as the photocatalytic particles can be suitably combined with each of the constituent elements of the present invention described up to here, and new effects mentioned above may also be exerted without hindering the effects of the constituent elements.

As the photocatalytic particles, anatase-type titanium oxide is preferable among titanium oxide particles. Anatase-type titanium oxide has an oxidation power stronger than rutile-type titanium oxide and exerts stronger photocatalytic function such as gas decomposition. Furthermore, using anatase-type titanium oxide particles as the photocatalytic particles can be suitably combined with each of the constituent elements of the present invention described up to here, and new effects mentioned above may also be exerted without hindering the effects of the constituent elements.

It is preferable that Cu component is further present in the photocatalytic layer. Cu itself has excellent antifungal characteristics and excellent adsorption characteristics for harmful gases and acts on the photocatalytic particles to decrease the probability of recoupling of conductive electron and positive hole generated by photoexcitation of the photocatalyst, resulting in increasing the oxidation power and gas decomposition power of the photocatalytic particles. Larger effect is exerted if the photocatalyst is a photocatalyst having intrinsically strong oxidation power, such as titanium oxide, especially anatase-type titanium oxide. Furthermore, making Cu present in the photocatalytic layer can be suitably combined with each of the constituent elements of the present invention described up to here, and new effects mentioned above may also be exerted without hindering the effects of the constituent elements.

It is preferable that Cu component is supported on the photocatalytic particles. The embodiment in which not only Cu is present in the photocatalytic layer but also is positively supported on the photocatalytic particles can further enhance the effect of Cu to act on the photocatalytic particles to decrease the probability of recoupling of conductive electron and positive hole generated by photoexcitation of the photocatalyst, resulting in increasing the oxidation power and gas decomposition power of the photocatalytic particles. Larger effect is exerted if the photocatalyst is a photocatalyst having intrinsically strong oxidation power, such as titanium oxide, especially anatase-type titanium oxide. Furthermore, making Cu positively supported on the photocatalytic particles can be suitably combined with each of the constituent elements of the present invention described up to here, and new effects mentioned above may also be exerted without hindering the effects of the constituent elements.

It is preferable that both of the Cu component and the Ag component are present in the photocatalytic layer. Presence of both of Cu and Ag in the photocatalytic layer not only exerts the excellent antifungal characteristics of Cu and the excellent antibacterial characteristics of Ag simultaneously, but substantially increases the decomposition activity of the photocatalyst. Although the mechanism is not clear at present, mutual interactions among the photocatalytic particles, Ag, and Cu are presumably correlated. Larger effect is exerted if the photocatalyst is a photocatalyst having intrinsically strong oxidation power, such as titanium oxide, especially anatase-type titanium oxide. Furthermore, making both of Cu and Ag present in the photocatalytic layer can be suitably combined with each of the constituent elements of the present invention described up to here, and new effects mentioned above may also be exerted without hindering the effects of the constituent elements.

It is preferable that both of the Cu component and the Ag component are supported on the photocatalytic particles. The embodiment in which not only Cu and Ag are present in the photocatalytic layer but also both of Cu and Ag are supported on the photocatalytic particles can further enhance the effect of Cu and Ag to act on the photocatalytic particles to decrease the probability of recoupling of conductive electron and positive hole generated by photoexcitation of the photocatalyst, resulting in increasing the oxidation power and gas decomposition power of the photocatalytic particles. Larger effect is exerted if the photocatalyst is a photocatalyst having intrinsically strong oxidation power, such as titanium oxide, especially anatase-type titanium oxide. Furthermore, making both of Cu and Ag positively supported on the photocatalytic particles can be further suitably combined with each of the constituent elements of the present invention described up to here, and new effects mentioned above may also be exerted without hindering the effects of the constituent elements.

As the inorganic oxide particles in the photocatalytic layer, for example, particles of single oxide such as silica, alumina, zirconia, ceria, yttria, boronia, magnesia, calcia, ferrite, iron oxide, amorphous titania, hafnia, tin oxide, manganese oxide, niobium oxide, nickel oxide, cobalt oxide, indium oxide, lanthanum oxide, barium oxide, etc.; or complex oxide such as aluminosilicate, barium titanate, calcium silicate, etc. can be suitably used.

It is considered that mixing the inorganic oxide particles can moderately decrease the amount of the photocatalyst and minimize the direct contact of the photocatalytic particles with the substrate to the minimum, while securing the gas permeability in the photocatalytic layer, thereby making the erosion of the substrate (especially the organic substrate) less likely to occur. In addition, it is considered that deterioration of the substrate by ultraviolet light can be reduced by reducing the dose of the ultraviolet light reaching the substrate since the photocatalyst itself absorbs the ultraviolet light.

Furthermore, using the aforementioned inorganic oxide particles can be suitably combined with each of the constituent elements of the present invention described up to here, and new effects mentioned above may also be exerted without hindering the effects of the constituent elements.

As the inorganic oxide particles in the photocatalytic layer, silica is the most preferable. Mixing silica increases the hydrophilicity of the photocatalytic layer, and the photocatalytic layer being washed by with water or rainwater effectively prevents the stain adhered to the surface from decreasing the decomposition function of the photocatalyst. This preventive effect is especially enhanced if the photocatalyst is a photocatalyst having intrinsically strong oxidation power, such as titanium oxide, especially anatase-type titanium oxide. Furthermore, using silica particles as the inorganic oxide particles can be suitably combined with each of the constituent elements of the present invention described up to here, and new effects mentioned above may also be exerted without hindering the effects of the constituent elements.

As for the inorganic oxide particles in the photocatalytic layer, the number average particle diameter calculated by the measurement of the length of arbitrary 100 particles within a visual field of a scanning electron microscope with 200,000× magnification is preferably 5 nm or more and less than 40 nm, more preferably more than 5 nm and 20 nm or less.

By using the inorganic oxide particles of the average particle diameter of less than 40 nm, more preferably 20 nm or less, the gas permeability in the photocatalytic layer and gas decomposition reactivity is increased, and the abrasion resistance is increased.

Furthermore, making the inorganic oxide particles have a number average particle diameter of 5 nm or more and less than 40 nm, more preferably more than 5 nm and 20 nm or less, can be suitably combined with each of the constituent elements of the present invention described up to here, and new effects mentioned above may also be exerted without hindering the effects of the constituent elements.

The photocatalytic layer may comprise a surfactant as an optional component. The surfactant used in the present invention may be comprised in the photocatalytic layer as an optional component in an amount of 0 part by mass or more and less than 10 parts by mass, preferably 0 part by mass or more and 8 parts by mass or less, more preferably 0 or more and 6 parts by mass or less, relative to the total amount of 100 parts by mass of the photocatalytic particles, the inorganic oxide particles, and the hydrolyzable silicone. One of the effects of the surfactant is leveling property to the substrate. In applications where the leveling effect is necessary, such as coating in a large area, amount of the surfactant may be determined in the aforementioned range as needed depending on the combination of the coating liquid and the substrate. The lower limit in this case is preferably 0.1 part by mass relative to the total amount of 100 parts by mass of the photocatalytic particles, the inorganic oxide particles, and the hydrolyzable silicone. Although the surfactant is an effective component to improve the wettability of the photocatalytic coating liquid, it is equivalent to the inevitable impurity which no longer contributes to the effect of the photocatalyst-coated body of the present invention in the photocatalytic layer formed after applying and drying. Therefore, the upper limit should be less than 10 parts by mass, preferably less than 8 parts by mass, more preferably 6 parts by mass or less, relative to the total amount of 100 parts of the photocatalytic particles, inorganic oxide particles, and the hydrolyzable silicone. That is, the surfactant may be used in the aforementioned range of the amount depending on the wettability required for the photocatalytic coating liquid. It is most preferable that the surfactant is virtually or definitely not comprised in applications where the wettability is not required. The surfactant to be used may be selected from nonionic surfactant, anionic surfactant, cationic surfactant, and amphoteric surfactant as needed considering the dispersion stability of the photocatalyst and the inorganic oxide particles and the wettability when applied on the intermediate layer. Among these a nonionic surfactant is especially preferable, among which more preferable are ether-type nonionic surfactant, ester-type nonionic surfactant, polyalkylene glycol-type nonionic surfactant, fluorine-type nonionic surfactant, and silicone-based nonionic surfactant.

Furthermore, making the surfactant used in the present invention be comprised in the photocatalytic layer as an optional component in an amount of 0 part by mass or more and less than 10 parts by mass, preferably 0 part by mass or more and 8 parts by mass or less, more preferably 0 or more and 6 parts by mass or less, relative to the total amount of 100 parts by mass of the photocatalytic particles, the inorganic oxide particles and the hydrolyzable silicone can be suitably combined with each of the constituent elements of the present invention described up to here, and new effects mentioned above may also be exerted without hindering the effects of the constituent elements.

It is preferable that the photocatalytic layer has a film thickness of 0.5 µm or more and 3.0 µm or less, more preferably 1.0 µm or more and 2.0 µm or less. By using the photocatalytic layer of the film thickness of 0.5 µm or more, more preferably 1.0 µm or more, weather resistance is increased because the ultraviolet light reaching the interface of the photocatalytic layer and the substrate is sufficiently attenuated. In addition, harmful gas decomposability is also increased because amount of the photocatalytic particles, the content of which is lower than the inorganic oxide particles, can be increased in the direction of the film thickness. Furthermore, excellent characteristics in transparency and film strength can be attained by using the photocatalytic layer of the film thickness of 3.0 µm or less, more preferably 2.0 µm or less.

Furthermore, making the film thickness of the photocatalytic layer 0.5 µm or more and 3.0 µm or less, more preferably 1.0 µm or more and 2.0 µm, can be suitably combined with each of the constituent elements of the present invention described up to here, and new effects mentioned above may also be exerted without hindering the effects of the constituent elements.

The photocatalytic layer may further comprise a hydrolyzed condensation-polymerization product of titanium alkoxide or a derivative of titanium alkoxide as an optional component in an amount of 0 part by mass or more and less than 10 parts by mass, preferably 0 part by mass or more and less than 8 parts by mass, more preferably less than 6 parts by mass, in terms of titanium dioxide.

If the photocatalytic layer comprises the hydrolyzed condensation-polymerization product of titanium alkoxide or the derivative of titanium alkoxide in an amount as small as less than 10 parts by mass, preferably less than 8 parts by mass, more preferably less than 6 parts by mass, in terms of titanium dioxide, abrasion resistance slightly increases and curing of the photocatalytic layer may be expected in shorter time after coating compared with the hydrolyzable silicone. However, it is preferable that the interstices between the particles of the photocatalytic layer are sufficiently maintained in order to take advantage of the photocatalytic gas decomposition characteristics of the present invention such as the excellent ability to decompose NOx. If the hydrolyzed condensation-polymerization product of titanium alkoxide or the derivative of titanium alkoxide is used in an amount as large as 10 parts by mass or more in terms of titanium dioxide, it is considered that such interstices between the particles are densely filled, similarly to the case where a large amount of a hydrolyzable silicone commonly used as a binder for the photocatalytic layer is used, resulting in prevention of the diffusion of gases. On the other hand, since the photocatalytic layer of the present embodiment does not comprise the hydrolyzed condensation-polymerization product of titanium alkoxide or the derivative of titanium alkoxide or, even if it comprises some, the content is less than 10 parts by mass relative to the total amount of 100 parts by mass of the photocatalytic particles, the inorganic oxide particles, and the dried substance of titanium alkoxide in terms of titanium dioxide, interstices between the particles can be sufficiently maintained and secured, and thus attain a structure which facilitates diffusion of the harmful gases such as NOx and SOx into the photocatalytic layer. As a result, it is considered that the harmful gases effectively contact with the photocatalytic particles and are decomposed by the photocatalytic activity.

Considering the aforementioned function and effect, as a more preferred constituent in the present embodiment, it is preferable that the sum of the amount of the hydrolyzed condensation-polymerization product of titanium alkoxide or the derivative of titanium alkoxide in terms of titanium dioxide and the amount of the dried substance of the hydrolyzable silicone in terms of silica is 0 part by mass or more and less than 10 parts by mass, preferably 0 part by mass or more and less than 8 parts by mass, more preferably 0 part by mass or more and less than 6 parts by mass. It is the most preferable that the amount of the hydrolyzed condensation-polymerization product of titanium alkoxide or the derivative of titanium alkoxide in terms of titanium dioxide is virtually 0 part by mass.

In addition, making the photocatalytic layer further comprise the hydrolyzed condensation-polymerization product of titanium alkoxide or the derivative of titanium alkoxide as an optional component in an amount of 0 part by mass or more and less than 10 parts by mass, preferably 0 part by mass or more and less than 8 parts by mass, more preferably less than 6 parts by mass in terms of titanium dioxide; more preferably making the sum of the amount of the hydrolyzed condensation-polymerization product of titanium alkoxide or the derivative of titanium alkoxide in terms of titanium dioxide and the amount of the dried substance of the hydrolyzable silicone in terms of silica 0 part by mass or more and less than 10 parts by mass, preferably 0 part by mass or more and less than 8 parts by mass, more preferably 0 part by mass or more and less than 6 parts by mass; and making the amount of the hydrolyzed condensation-polymerization product of titanium alkoxide or the derivative of titanium alkoxide in terms of titanium dioxide virtually 0 part by mass can be suitably combined with each of the constituent elements of the present invention described up to here, and new effects mentioned above may also be exerted without hindering the effects of the constituent elements.

It is preferable that the photocatalytic layer is obtained by heat drying at 200° C. or lower. Accordingly, deterioration of the substrate associated with heating is effectively prevented when the substrate is a resin.

In addition, obtaining the photocatalytic layer by heat drying at 200° C. or lower can be suitably combined with each of the constituent elements of the present invention described up to here, and new effects mentioned above may also be exerted without hindering the effects of the constituent elements.

It is preferable that the hydrolyzable silicone is an organosiloxane having at least one reactive group selected from a group of alkoxy groups, halogen groups, and hydrogen group.

Since these hydrolyzable silicones harden by dehydrative condensation-polymerization by drying at ambient temperature or heat treatment at 10° C. or higher and 500° C. or lower to give a rigid dried substance of the hydrolyzable silicone, the abrasion resistance can be increased.

As the hydrolyzable silicone, a silicone (oligomer and polymer) having a reactive group at its end which is obtained by polymerizing a bifunctional silane, trifunctional silane, or tetrafunctional silane as its monomer unit singly or in combination can be advantageously used. Among these, a silicate obtained by polymerizing a tetrafunctional silane unit ($SiX_4$, X is at least one reactive group selected from a group of alkoxy groups, halogen groups, or hydrogen group) only (hereinafter referred to as tetrafunctional silicone) is the most preferable. Using the tetrafunctional silicone is preferable because the hydrophilicity of the photocatalytic layer is good and self-cleaning property is exerted at the same time. As the tetrafunctional silicone, an alkyl silicate such as methyl silicate, ethyl silicate, and isopropyl silicate can be advantageously used.

In addition, making the hydrolyzable silicone an organosiloxane having at least one reactive group selected from a group of alkoxy groups, halogen groups, and hydrogen group; using the silicone (oligomer and polymer) having a reactive group at its end which is obtained by polymerizing a bifunctional silane, trifunctional silane, or tetrafunctional silane preferably as its monomer unit singly or in combination, as the hydrolyzable silicone; and more preferably using the tetrafunctional silicone can be suitably combined with each of the constituent elements of the present invention described up to here, and new effects mentioned above may also be exerted without hindering the effects of the constituent elements.

It is more preferable that the hydrolyzable silicone is an organosiloxane having an alkoxy group. The organosiloxane having an alkoxy group enables more controllable dehydrative condensation-polymerization reaction compared with the organosiloxane having a halogen or hydrogen group and is likely to give a photocatalytic layer with a stable quality.

In addition, making the hydrolyzable silicone the organosiloxane having an alkoxy group can be suitably combined with each of the constituent elements of the present invention described up to here, and new effects mentioned above may also be exerted without hindering the effects of the constituent elements.

It is more preferable that the dried substance of the hydrolyzable silicone is a hydrolytic condensation-polymerization product of the hydrolyzable silicone.

The hydrolytic condensation-polymerization reaction is more controllable compared with other radical polymerization reaction and the like and is likely to give a photocatalytic layer with a stable quality.

In addition, making the dried substance of the hydrolyzable silicone the hydrolytic condensation-polymerization product of the hydrolyzable silicone can be suitably combined with each of the constituent elements of the present invention described up to here, and new effects mentioned above may also be exerted without hindering the effects of the constituent elements.

Substrate

The substrate usable in the present invention may be various materials on which the photocatalyst layer can be formed, regardless of an organic material or an inorganic material, and the shape of the substrate is not limited. Preferable examples of substrates in view of material include metals, ceramics, glasses, plastics, rubbers, stones, cements, concretes, fibers, fabrics, woods, papers, combinations of these, laminations of these, and ones having at least one coated layer on the surface of these. Preferable examples of substrates in view of application include building materials; building exterior materials; window frames; window glasses; structural members; exterior components and coating of vehicles; exterior components of machines; apparatus and goods; dustproof masks and coating; traffic signs; various types of displays; advertising pillars; road sound barriers; railway sound barriers; bridges; exterior components and coating of crash barriers; inner walls and coating of tunnels; insulators; solar cell covers; heat-collecting covers for solar water heaters; plastic greenhouses; vehicle lamp covers; outdoor lighting apparatus; pedestals; and various exterior materials such as films, sheets and seals to be attached to the surfaces of the above articles.

According to a preferred aspect of the present invention, the substrate may have at least the surface composed of an organic material, and include a substrate entirely made of an organic material and a substrate made of an inorganic material of which the surface is covered with an organic material (e.g., decorative plate). According to the photocatalyst layer of the present invention, corrosion does not easily occur in an organic material, which is sensitive to the photocatalyst activity, a photocatalyst-coated body having superior functions can be produced by use of the photocatalyst layer alone without an intermediate layer. As a result, since there is no necessity to form the intermediate layer, it is possible to save time and cost required for manufacturing photocatalyst-coated bodies.

In addition, using the substrate having at least a surface formed of an organic material as the substrate can be suitably combined with each of the constituent elements of the present invention described up to here, and new effects mentioned above may also be exerted without hindering the effects of the constituent elements.

An embodiment in which the photocatalytic layer is directly coated on the substrate can also exert the features of the present invention more sufficiently, because the photocatalytic layer of the present invention is excellent in adaptability to the surface irregularity and the like of the substrate, since the photocatalytic layer of the present invention is mainly composed of particles.

In addition, making the photocatalytic layer directly coated on the substrate can be suitably combined with each of the constituent elements of the present invention described up to here, and new effects mentioned above may also be exerted without hindering the effects of the constituent elements.

It is also preferable that an intermediate layer is provided between the substrate and the photocatalytic layer. Especially by utilizing a substance excellent in weather resistance as the intermediate layer, the weather resistance can be increased when the substrate is a resin. As the substance excellent in weather resistance, a silicone-containing resin and a fluorine-containing resin are especially preferable. In addition, utilizing a substance excellent in flexibility as the intermediate layer is preferable because poor appearance due to the cracks and the like is unlikely to occur in use even if the substrate has irregularity. As the substance excellent in flexibility used for the intermediate layer, a resin having a double chain structure, a resin having a cyclic structure, a silicone having a bifunctional monomer unit, and a silicone having both of organic and inorganic crosslinks are especially preferable.

In addition, providing the intermediate layer between the substrate and the photocatalytic layer; using the substance excellent in weather resistance as the intermediate layer; using at least one of the silicone-comprising resin and the fluorine-comprising resin as the substance excellent in weather resistance; using the substance excellent in flexibility as the intermediate layer; and using at least one of the resin having a double chain structure, the resin having a cyclic structure, the silicone having a bifunctional monomer unit, and the silicone having both of organic and inorganic crosslinks as the substance excellent in flexibility can be suitably combined with each of the constituent elements of the present invention described up to here, and new effects mentioned above may also be exerted without hindering the effects of the constituent elements.

The intermediate layer preferably comprises a silicone-modified resin and, more preferably, an acrylic silicone.

In this way, the weather resistance of the intermediate layer, durability against the photocatalytic reaction, flexibility and the like can be sufficiently exerted.

As the silicone-modified resin, a silicone-modified acrylic resin, a silicone-modified epoxy resin, a silicone-modified urethane resin, a silicone-modified polyester, etc. which include polysiloxane in the resin are more preferable from the point of weather resistance.

It is preferable that the silicone-modified resin comprises silicon atom in an amount of 0.2% by mass or more and less than 16.5% by mass, more preferably 6.5% by mass or more and less than 16.5% by mass relative to the solid content of the silicone-modified resin. If the silicon atom content comprised in the silicone-modified resin is 0.2% by mass or more, the weather resistance of the intermediate layer is good and the possibility of erosion by the photocatalyst is suppressed. If the silicon atom content comprised in the silicone-modified resin is less than 16.5% by mass, sufficient flexibility is attained and occurrence of cracks in the intermediate layer is suppressed. The silicon atom content in the aforementioned silicone-modified resin can be measured by the chemical analysis using an X-ray electronic spectroscopic analyzer (XPS).

In addition, it is more preferable that two fluids of the silicone-modified acrylic resin having a carboxyl group and the silicone resin having an epoxy group are mixed and used as the acrylic silicone, from a point of increasing the strength of the coated film.

Although the dry film thickness of the intermediate layer is not particularly limited, it is preferably 1 µm to 50 µm, more preferably 1 µm to 10 µm. If the film thickness is less than 1 µm, the effect to restrict the deterioration of the intermediate layer and the substrate by the photocatalyst may be meager. If the film thickness is more than 50 µm, fine cracks may occur after drying, depending on the type of the intermediate layer.

In addition, making the intermediate layer comprise the silicone-modified resin; making the silicone-modified resin comprise silicon atom in an amount of 0.2% by mass or more and less than 16.5% by mass, more preferably 6.5% by mass or more and less than 16.5% by mass; making the intermediate layer comprise the acrylic silicone; preferably mixing two fluids of the silicone-modified acrylic resin having a carboxyl group and the silicone resin having an epoxy group to be used as the acrylic silicone; and making the dry film thickness of the intermediate layer preferably 1 µm to 50 µm, more preferably 1 µm to 10 µm, can be suitably combined with each of the constituent elements of the present invention described up to here and can exert new effects mentioned above without hindering the effects of the constituent elements.

It is preferable that the intermediate layer comprises an ultraviolet absorption agent. In this way, the weather resistance and the durability against the photocatalytic reaction of the substrate can be further increased.

In addition, making the intermediate layer comprise the ultraviolet absorption agent can be suitably combined with each of the constituent elements of the present invention described up to here and can exert new effects mentioned above without hindering the effects of the constituent elements.

The intermediate layer preferably comprises an organic antifungal agent. By virtue of the organic antifungal agent comprised in the intermediate layer different from the photocatalytic layer as well as the interstices provided between the particles of the photocatalytic layer, the antialgal and antifungal function of the photocatalyst and the antialgal and antifungal function of the organic antifungal agent can be effectively exerted without mutual deterioration.

In addition, making the intermediate layer comprise the organic antifungal agent can be suitably combined with each of the constituent elements of the present invention described up to here and can exert new effects mentioned above without hindering the effects of the constituent elements.

The intermediate layer may further comprise additives for paint such as organic solvent, colored pigment, body pigment, pigment dispersant, antifoaming agent, antioxidant, and the like and other components usually comprised in the paint. In addition, silica microparticles may be comprised as a matting agent.

The aforementioned colored pigment is not particularly limited and, for example, inorganic pigments such as titanium dioxide, iron oxide, carbon black and the like and organic pigments such as phthalocyanine series, benzimidazolone series, isoindolinone series, azo series, anthraquinone series, quinophthalone series, anthrapyridinine series, quinacridone series, toluidine series, pyrathrone series, perylene series, and the like may be used.

Although the coated body of the present invention is applicable to both of exterior and interior materials, it is preferably used for exterior materials because the sunlight can be used as the light source for the photocatalyst. As the exterior material, architectural material, exterior of buildings, window frame, window glass, structural member, exterior and coating of vehicle, exterior of machines and articles, cover and coating for dust prevention, traffic signs, various display apparatus, advertising pillar, sound insulation wall for road, sound insulation wall for railway, bridge, exterior and coating for guard rail, interior and coating for tunnel, insulator, cover for solar cell, heat collection cover for solar water heater, greenhouse, cover for vehicle illuminating lamp, exterior lighting apparatus, rack, and film, sheet, seal, etc. to adhere on the aforementioned articles are exemplified.

In addition, using the coated body as an exterior material can be suitably combined with each of the constituent elements of the present invention described up to here and can exert new effects mentioned above without hindering the effects of the constituent elements.

Furthermore, at least one metal and/or metal compound comprising the metal selected from a group composed of vanadium, iron, cobalt, nickel, manganese, palladium, zinc, ruthenium, rhodium, platinum and gold may be added in the photocatalytic layer. In this way, the catalytic function of these metals may be expressed simultaneously.

Photo-Crystal Layer and Photo-Crystal Coating Liquid for Forming it

The photocatalyst layer according to the present invention comprises 1 part or more and less than 20 parts by mass of photocatalyst particles, 70 parts or more and less than 99 part by mass of inorganic oxide particles, zero parts or more and less than 10 parts by mass of a hydrolyzable silicone, and zero parts or more and less than 10 parts by mass of a surfactant. The total amount of the photocatalyst particles, the inorganic oxide particles and the hydrolyzable silicone is 100 parts by mass. The photocatalyst layer can be formed by coating the substrate with a photocatalyst coating liquid comprising a solvent and a solute comprising the above-described constituents in the above-described mass ratio dispersed in the solvent.

According to a preferred aspect of the present invention, the film thickness of the photocatalyst layer is preferably 0.5 µm to 3.0 µm, more preferably 1.0 µm to 2.0 µm. Within this film-thickness range, ultraviolet light reaching the interface between the photocatalyst layer and the substrate is sufficiently attenuated, leading to an improvement in weather resistance. In addition, it is possible to increase the amount of photocatalyst particles positioned in the film-thickness direction although the content ratio of the photocatalyst particle is lower than that of the inorganic oxide particles, resulting in an improvement in noxious gas decomposability. Further, superior properties in ultraviolet absorptivity, transparency and film strength can be provided.

The photocatalyst particles usable in the present invention are not particularly limited as far as they have photocatalyst activity, and particles of various types of photocatalysts can be used. Examples of the photocatalyst particles include metal-oxide particles such as particles of titanium oxide ($TiO_2$), $ZnO$, $SnO_2$, $SrTiO_3$, $WO_3$, $Bi_2O_3$, and $Fe_2O_3$, preferably titanium oxide particles, more preferably anatase titanium oxide particles. The titanium oxide is harmless, chemically stable and available in low cost. Because of its high band gap energy, the titanium oxide needs ultraviolet light for photoexcitation and does not absorb visible light in the process of the photoexcitaiton. As a result, coloration by complementary color components does not occur. The titanium oxide is available in various forms such as powder, sol, and solution. Any form of titanium oxide may be employed as far as it exhibits photocatalyst activity. According to a preferred aspect of the present invention, the photocatalyst particles preferably have an average particle size of 10 nm to 100 nm, more preferably 10 nm to 60 nm. The average particle size is calculated as a number average value obtained by measuring the lengths of 100 particles randomly selected from the particles located within a visible field magnified 200,000 times by a scanning electron microscope. The most suitable shape of the particle is a perfect sphere, but an approximately round or elliptical particle may be employed, in which case the length of the particle is approximately calculated as ((long diameter+short diameter)/2). Within this range, the weather resistance, the noxious gas decomposability, and the desired coating properties (such as ultraviolet absorptivity, transparency and film strength) are effectively exhibited. When a commercially available photocatalyst of sol form is used and processed so that the particle diameter becomes 30 nm or less, preferably 20 nm or less, it is also possible to produce a photocatalyst layer with especially high transparency.

The content of the photocatalyst particles in the photocatalyst layer or the coating liquid of the present invention is 1 part or mote and less than 20 parts by mass, preferably 5 parts to 15 parts by mass, more preferably 5 parts to 10 parts by mass with respect to the total 100 parts by mass of the photocatalyst particles, the inorganic oxide particles and the hydrolyzable silicone. Since the proportion of the photocatalyst particles is set to be low as described above, direct contact of the photocatalyst particles with the substrate is reduced as much as possible, thus suppressing corrosion of the substrate (in particular the organic material). As a result, it is supposed that the weather resistance is also improved. Nevertheless, the functions of the noxious gas decomposability and the ultraviolet absorptivity to be caused by photocatalyst activity can be also effectively exhibited.

According to a preferred aspect of the present invention, titania may be added to the photocatalyst layer or the photocatalyst coating liquid, together with at least one metal selected from the group consisting of vanadium, iron, cobalt, nickel, palladium, zinc, ruthenium, rhodium, lead, copper, silver, platinum and gold and/or a metallic compound of these metals, in order to improve the photocatalytic ability. This addition can be conducted in accordance with either a method of adding a solution containing a photocatalyst and the above-described metal or metallic compound as it is or a method of using the photocatalysis redox reaction to allow the metal or metallic compound to be supported on the photocatalyst.

The inorganic oxide particles employed in the present invention is not particularly limited as long as they are capable of being combined with the photocatalyst particles to form a layer, and any type of inorganic oxide particles may be employed. Examples of such inorganic oxide particles include particles of a single oxide such as silica, alumina, zirconia, ceria, yttria, boronia, magnesia, calcia, ferrite, amorphous titania and hafnia; and particles of a composite oxide such as barium titanate and calcium silicate, preferably silica particles. These inorganic oxide particles preferably are in an aqueous colloid form with water as a dispersion medium or in an organosol form of a colloidal dispersion in a hydrophilic solvent such as ethyl alcohol, isopropyl alcohol or ethylene glycol, and colloidal silica is particularly preferable. According to a preferred aspect of the present invention, the average particle size of the inorganic oxide particles is preferably 10 nm or more and less than 40 nm, more preferably 10 nm to 30 nm. The average particle size is calculated as a number average value obtained by measuring the lengths of 100 particles randomly selected from the particles located within a visible field magnified 200,000 times by a scanning electron microscope. The most suitable shape of the particle is a perfect sphere, but an approximately round or elliptical particle may be employed, in which case the length of the particle is approximately calculated as ((long diameter+short diameter)/2). Within this range, the weather resistance, the noxious gas decomposability, and the desired coating properties (such as ultraviolet absorptivity, transparency and film strength) are effectively exhibited. In particular, it is also possible to produce a transparent photocatalyst layer with especially high adhesion.

The content of the inorganic oxide particles in the photocatalyst layer or the coating liquid of the present invention is 70 parts or more and less than 99 parts by mass, preferably 80 parts to 95 parts by mass, more preferably 85 parts to 95 parts by mass, further preferably 90 parts to 95 parts by mass, with respect to the total 100 parts by mass of the photocatalyst particles, the inorganic oxide particles and the hydrolyzable silicone.

The photocatalyst layer of the present invention preferably is substantially free from the hydrolyzable silicone, more preferably completely free from the hydrolyzable silicone. The hydrolyzable silicone is a generic name for organosiloxane having an alkoxy group and/or a partial hydrolysis condensate of the organosiloxane. However, the hydrolyzable silicone may be added as an optional component to such a level that the noxious gas decomposability of the present invention can be ensured. Accordingly, the hydrolyzable silicone content is, on a silica basis, zero parts or more and less than 10 parts by mass, preferably 5 parts or less by mass, most preferably zero parts by mass, with respect to the total 100 parts by mass of the photocatalyst particles, the inorganic oxide particles and the hydrolyzable silicone. A tetrafunctional silicone compound is frequently used as a hydrolyzable silicone, and is commercially available, for example, as ethylsilicate 40 (oligomer, R is an ethyl group), ethylsilicate 48 (oligomer, R is an ethyl group), methylsilicate 51 (oligomer, R is methyl group), all of which are produced by Colcoat Co. Ltd.

The surfactant usable in the present invention may be added to the photocatalyst layer in an amount of zero parts or more by mass and less than 10 parts by mass as an optional component, preferably zero parts to 8 parts by mass, more preferably zero parts to 6 parts by mass. One of the effects of the surfactant is the leveling properties to the substrate. Therefore, the amount of surfactant may be appropriately determined within the aforementioned range, depending on a combination of the coating liquid and the substrate. In this case, the lower limit of the content of the surfactant may be 0.1 parts by mass. The surfactant is a component effective for improving the coating properties of the photocatalyst coating liquid. In the photocatalyst layer formed after being coated, however, the surfactant corresponds to unavoidable impurities which do not contribute to the benefits provided by the photocatalyst-coated body of the present invention. Accordingly, the surfactant can be employed within in the above content range depending on coating properties required for the photocatalyst coating liquid. If coating properties are not considered, substantially no or completely no surfactant may be comprised. A surfactant to be used may be suitably chosen in view of dispersion stability of photocatalyst or inorganic oxide particles or coating properties when the coating is applied to an intermediate layer. Preferred examples of the surfactant include nonionic surfactants, more preferably ether-type nonionic surfactants, ester-type nonionic surfactants, poly-alkylene glycol-type nonionic surfactants, fluorinated nonionic surfactants, and silicon-based nonionic surfactants.

The photocatalyst coating liquid of the present invention can be obtained by dispersing the photocatalyst particles, the inorganic oxide particles, and optionally the hydrolyzable silicone and the surfactant, into a solvent in the aforementioned specific proportion. Any type of solvent may be employed in which the above-described constituents can be appropriately dispersed, and may be water or an organic solvent. The solid concentrations of the photocatalyst coating liquid of the present invention are not particularly limited, but is preferably 1 mass % to 10 mass % for coating easily.

Analysis of the constituents in the photocatalyst composition can be conducted by using ultrafiltration to separate the coating liquid into particle components and a filtrate to be respectively analyzed in infrared spectroscopic analysis, gel permeation chromatography, X-ray fluorescence spectrochmeical analysis or the like for spectral analysis.

Manufacturing Process

The photocatalyst-coated body of the present invention can be readily manufactured by applying the photocatalyst coating liquid of the present invention to the substrate. Application of the photocatalyst layer can be conducted in accordance with conventional methods, which includes brush application, roller, spraying, roll coater, flow coater, dip coating, screen printing, electrolytic deposition, vapor deposition, and the like. The coating liquid after applied to the substrate may be dried at room temperature or, if needed, may be dried by heating. Since the photocatalyst layer of the photocatalyst-coated body of the present invention is less likely to corrode organic materials, which are vulnerable to photocatalyst activity, it is possible to use a photocatalyst layer alone without an intermediate layer to produce a photocatalyst-coated body having the superior functions. It is therefore possible to save time and cost required for manufacturing photocatalyst-coated bodies due to no necessity to form the intermediate layer.

EXAMPLES

The present invention will be described in detail with reference to the following Examples, but the present invention is not limited to these Examples.

The raw materials used to produce a photocatalyst coating liquid in the following Examples will be described below.

Photocatalyst Particles

Titania aqueous dispersion (average particle diameter: 30 nm to 60 nm, basic)

Inorganic Oxide Particles

Aqueous dispersion-type colloidal silica (produced by Nissan Chemical Industrials Ltd., trade name: SNOWTEX 50, particle diameter: 20 nm to 30 nm, solids content: 48%) (used in Examples 1 to 19 and Examples 24 to 27)

Aqueous dispersion-type colloidal silica (produced by Nissan Chemical Industrials Ltd., trade name: SNOWTEX 40, particle diameter: 10 nm to 20 nm, solids content: 40%) (used in Example 20)

Aqueous dispersion-type colloidal silica (produced by Nissan Chemical Industrials Ltd., trade name: SNOWTEX 50, particle diameter: 20 nm to 30 nm, solids content: 48%) (used in Example 21)

Aqueous dispersion-type colloidal silica (produced by Nissan Chemical Industrials Ltd., trade name: SNOWTEX S, particle diameter: 8 nm to 11 nm, solids content: 30%) (used in Example 22)

Aqueous dispersion-type colloidal silica (produced by Nissan Chemical Industrials Ltd., trade name: SNOWTEX XS, particle diameter: 4 nm to 6 nm, solids content: 20%) (used in Example 23)

Hydrolyzable Silicone

Polycondensate of tetramethoxysilane (produced by Tama Chemicals Co., Ltd., trade name: M silicate 51)

Surfactant

Polyether modified silicone surfactant (produced by Shin-Etsu Chemical Co., Ltd., trade name: silicone-modified polyether (KF-643))

Examples 1-7

Evaluation of Weather Resistance

A photocatalyst-coated body having a photocatalyst layer was produced as follows. A colored organic coated body was prepared as a substrate. The colored organic coated body was obtained by coating a float plate glass with a general-purposed acrylic silicone with a carbon black powder added, and then sufficiently drying and curing it. On the other hand, a photocatalyst coating liquid was prepared by mixing a titania aqueous dispersion as a photocatalyst, an aqueous dispersion-type colloidal silica as an inorganic oxide, water as a solvent, and a polyether-modified silicone surfactant all together in the proportions shown in Table 1. It should be noted that the photocatalyst coating liquid does not include the hydrolyzable silicone. The total solid concentration of the photocatalyst and the inorganic oxide in the photocatalyst coating liquid was 5.5% by mass.

The photocatalyst coating liquid thus obtained was applied, by spray coating, to the colored organic coated body which has been previously heated to 50° C. The photocatalyst coating liquid was then dried for 5 minutes at 120° C. In this way, a photocatalyst layer was formed to obtain a photocatalyst-coated body. When the film thickness of the photocatalyst layer was measured with a scanning electron microscope, the film thickness was about 0.5 μm in each of Examples 1 to 7.

A weathering test was conducted on the photocatalyst-coated body thus obtained with the size of 50 mm×100 mm as described below. The photocatalyst-coated body was placed in a sunshine weather meter (produced by SUGA TEST INSTRUMENTS CO., LTD., S-300C) in accordance with JIS B7753. After a lapse of 300 hours, a test piece was taken out to measure a color difference before and after the accelerated test with Color Meter ZE2000 produced by Nippon Denshoku Instruments Co., Ltd. The values Δb of the measurement were compared to evaluate the degree of color change.

The results are shown in Table 1 and FIG. 1, in which "G" means that the color showed little change and "NG" means that the values Δb became positive (yellow discoloration). As shown in Table 1 and FIG. 1, it has been found that the photocatalyst-coated body has sufficient weather resistance by setting the photocatalyst content in the photocatalyst layer to less than 20 parts by mass, preferably 15 parts or less by mass, even when the photocatalyst layer is formed on the organic substrate.

TABLE 1

| Example No. | Titanium oxide particles (part by mass) | Silica particles (part by mass) | Surfactant (part by mass) | Δb |
|---|---|---|---|---|
| 1 | 1 | 99 | 6 | G |
| 2 | 5 | 95 | 6 | G |
| 3 | 10 | 90 | 6 | G |
| 4 | 15 | 85 | 6 | G |
| 5 | 18 | 82 | 6 | G |
| 6* | 20 | 80 | 6 | NG |
| 7* | 30 | 70 | 6 | NG |

*Comparative Examples

Examples 8-11

Evaluation of Noxious Gas Decomposability

A photocatalyst-coated body having a photocatalyst layer was produced as follows. A colored organic coated body was prepared as a substrate. The colored organic coated body was obtained by coating a float plate glass with a general-purposed acrylic silicone with carbon black powder added, and then sufficiently drying and curing it. On the other hand, a photocatalyst coating liquid was prepared by mixing a titania aqueous dispersion as a photocatalyst, an aqueous dispersion-type colloidal silica as an inorganic oxide, water as a solvent, a polyether-modified silicone surfactant, and a polycondensate of tetramethoxysilane as a hydrolyzable silicone all together in the proportions shown in Table 2. It should be noted that the photocatalyst coating liquids in Examples 8 and 10 do not include the hydrolyzable silicone. The total solid concentration of the photocatalyst and the inorganic oxide in the photocatalyst coating liquid was 5.5% by mass.

The photocatalyst coating liquid thus obtained was applied, by spray coating, to the colored organic coated body which has been previously heated to 50° C. The photocatalyst coating liquid was then dried for 5 minutes at 120° C. In this way, a photocatalyst layer was formed to obtain a photocatalyst-coated body. When the film thickness (μm) of the photocatalyst layer was measured with a scanning electron microscope, the film thickness was about 1 μm in each of Examples 8 to 11.

A gas decomposition test was conducted on the photocatalyst-coated body thus obtained with the size of 50 mm×100 mm as described below. As a pretreatment, the photocatalyst-coated body was irradiated with BLB light at 1 mW/cm$^2$ for 12 hours or more. The coated body sample was placed in a reactor in accordance with JIS R1701. Air adjusted to 50% RH at 25° C. was mixed with NO gas to a level about 1000 ppb, and was introduced to the light-shielded reactor for 20 minutes. With the gas being introduced, the BLB light was applied at 3 mW/cm$^2$ for 20 minutes. The reactor was then shielded from light again in a condition where the gas is introduced. The amount of NOx removed was calculated from the NO concentrations and the NO$_2$ concentrations before and after the irradiation with the BLB light, in accordance with the following equation:

The amount of NOx removed=[NO (after BLB irradiation)−NO (at BLB irradiation)]−[NO$_2$ (at BLB irradiation)−NO$_2$ (after BLB irradiation)]

The results are shown in Table 2, in which "G" means that the amount of NOx removed is 400 ppb or more and "NG" means that the amount of NOx removed is 10 ppb or less. As shown in Table 2, it has been found that satisfactory NOx decomposition was demonstrated by the photocatalyst layer comprising the photocatalyst particles and the inorganic oxide and being substantially free from the hydrolyzable silicone. On the other hand, it has been found that the photocatalyst layer comprising 10 parts by mass of the hydrolyzable silicone lost NOx decomposability.

TABLE 2

| Ex. | Titanium oxide particles (PBM) | Silica particles (PBM) | Hydrolyzable silicone (PBM) | Surfactant (PBM) | NOx removal amount |
|---|---|---|---|---|---|
| 8 | 10 | 90 | 0 | 6 | G (461 ppb) |
| 9* | 10 | 80 | 10 | 6 | NG (2 ppb) |
| 10 | 15 | 85 | 0 | 6 | G (532 ppb) |
| 11 | 15 | 80 | 5 | 6 | G (441 ppb) |

PBM: Part by mass
*Comparative Example.

Examples 12-19

Measurement of Linear Transmittance and UV Shielding Rate

A photocatalyst-coated body having a photocatalyst layer was produced as follows. A float plate glass of 94% transmittance at the wavelength of 550 nm was prepared as a substrate. On the other hand, a photocatalyst coating liquid was prepared by mixing a titania aqueous dispersion as a photocatalyst, an aqueous dispersion-type colloidal silica as an inorganic oxide having an average particle diameter ranging from 20 nm to 30 nm, water as a solvent, and a polyether-modified silicone surfactant all together in the proportions shown in Table 3. It should be noted that the photocatalyst coating liquid does not include the hydrolyzable silicone. The total solid concentration of the photocatalyst and the inorganic oxide in the photocatalyst coating liquid was 5.5% by mass.

The photocatalyst coating liquid thus obtained was applied, by spray coating, to the colored organic coated body which has been previously heated to 50° C. The photocatalyst coating liquid was then dried for 5 minutes at 120° C. In this way, a photocatalyst layer was formed to obtain a photocatalyst-coated body. When the film thickness (μm) of the photocatalyst layer was measured with a scanning electron microscope, values were obtained as shown in Table 3.

Measurements of linear transmittance at 550 nm and ultraviolet (300 nm) shielding rate were conducted on a photocatalyst-coated body with the size of 50 mm×100 mm as described below by use of an UV/VIS/NIR spectrophotometer (produced by Shimadzu Corporation, UV-3150).

Figure 2:
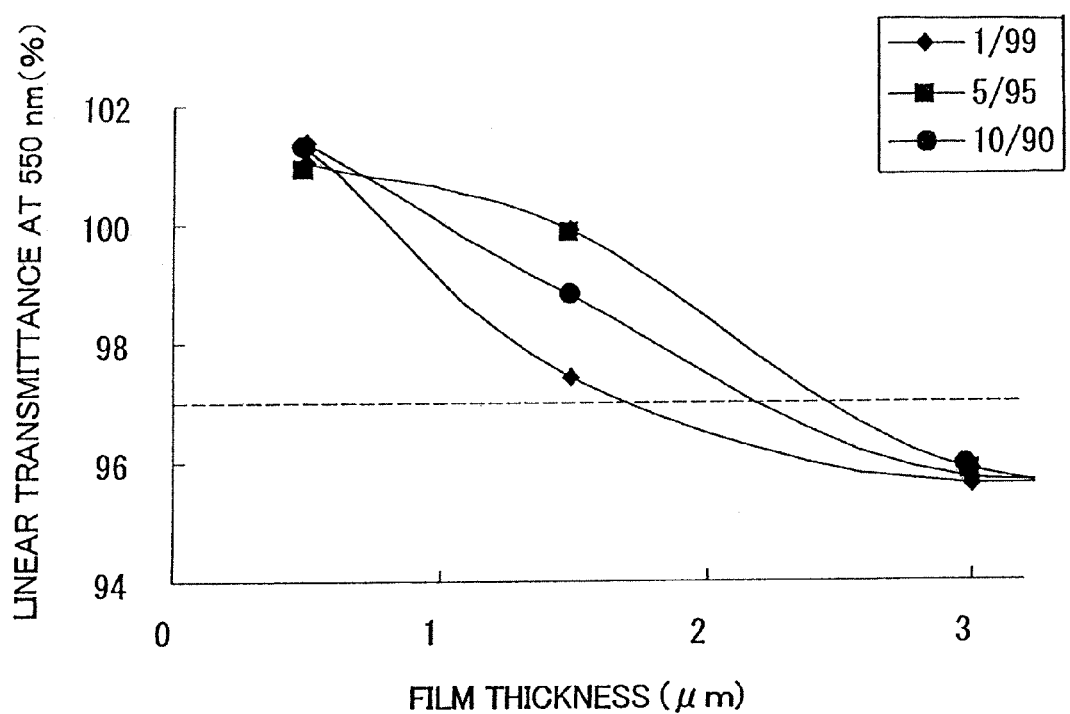
FIG. 2 is a graph showing the relationship between the linear transmittance at 550 nm (%) and the film thickness (μm), measured in Examples 12 to 19, in which the ratios of 1/99, 5/95, 10/90 represent the titanium-particle/silica-particle mass ratio.
Figure 3:
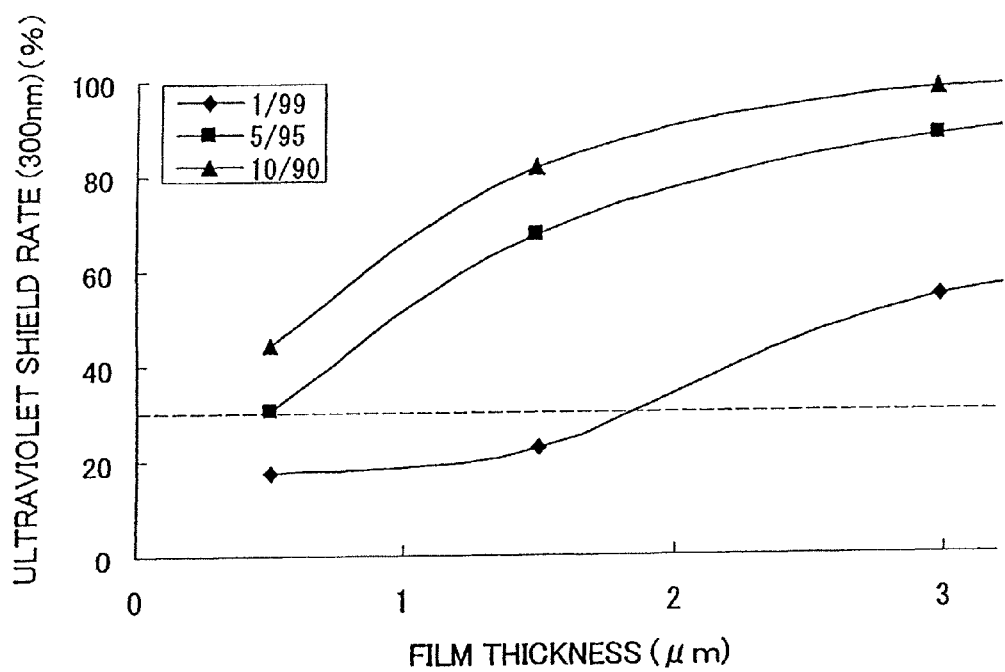
FIG. 3 is a graph showing the relationship between the ultraviolet (300 nm) shield rate (%) and the film thickness (μm), measured in Examples 12 to 19, in which the ratios of 1/99, 5/95, 10/90 represent the titanium-particle/silica-particle mass ratio.

The results are shown in Table 3 and FIGS. 2 and 3. Evaluation on linear transmittance and ultraviolet shielding rate was conducted according to the following criteria.

<Linear Transmittance>
A: linear transmittance at 550 nm is 97% or more
B: linear transmittance at 550 nm is 95% or more and less than 97%
C: linear transmittance at 550 nm is less than 95%

<UV Shielding Rate>
A: UV (300 nm) shielding rate is 80% or more
B: UV (300 nm) shielding rate is 30% or more and less than 80%
C: UV (300 nm) shielding rate is less than 30%

As shown in Table 3, FIG. 2 and FIG. 3, it has been found that it is possible to sufficiently shield the ultraviolet, which causes degradation of the organic substance, and to ensure transparency, by setting the film thickness to 3 μm or less when the content of the photocatalyst in the photocatalyst layer ranges from 5 parts to 15 parts by mass.

TABLE 3

| Ex. | Titanium oxide particles (PBM) | Silica particles (PBM) | Surfactant (PBM) | Film thickness (μm) | Linear transmittance (550 nm) | UV shielding rate (300 nm) |
|---|---|---|---|---|---|---|
| 12 | 5 | 95 | 6 | 0.5 | A | B |
| 13 | 5 | 95 | 6 | 1.5 | A | B |
| 14 | 10 | 90 | 6 | 0.5 | A | B |
| 15 | 10 | 90 | 6 | 1.5 | A | A |
| 16 | 5 | 95 | 6 | 3 | B | A |
| 17 | 10 | 90 | 6 | 3 | B | A |
| 18 | 1 | 99 | 6 | 0.5 | A | C |
| 19 | 1 | 99 | 6 | 1.5 | A | C |

PBM: Part by mass

Examples 20-23

Measurement of Haze

A photocatalyst-coated body having a photocatalyst layer was produced as follows. A float plate glass of 94% transmittance at the wavelength of 550 nm was prepared as a substrate. On the other hand, a photocatalyst coating liquid was prepared by mixing a titania aqueous dispersion as a photocatalyst, an aqueous dispersion-type colloidal silica as an inorganic oxides having various average particle diameters shown in Table 4, water as a solvent, and a polyether-modified silicone surfactant all together in the proportions shown in Table 4. It should be noted that the photocatalyst coating liquid does not comprise the hydrolyzable silicone. The total solid concentration of the photocatalyst and the inorganic oxide in the photocatalyst coating liquid was 5.5% by mass.

The photocatalyst coating liquid thus obtained was applied to the above-described substrate by spin coating at 1000 rpm for 10 seconds, and then dried for 5 minutes at 120° C. to form a photocatalyst layer. Haze was measured on a photocatalyst-coated body with the size of 50 mm×100 mm thus obtained by use of a haze meter (produced by Gardner Corporation, hazegard plus).

The results are shown in Table 4. As shown in Table 4, it has been found the haze value can be reduced to less than 1% so that transparency can be ensured, by setting the particle diameter of the metallic oxide particles in the photocatalyst layer to 10 nm to 30 nm.

TABLE 4

| Ex. | Titanium oxide particles (PBM) | Silica particles (PBM) | Silica particle diameter (nm) | Surfactant (PBM) | Haze (%) |
|---|---|---|---|---|---|
| 20 | 10 | 90 | 10-20 | 6 | 0.68 |
| 21 | 10 | 90 | 20-30 | 6 | 0.48 |
| 22 | 10 | 90 | 8-11 | 6 | 1.11 |
| 23 | 10 | 90 | 4-6 | 6 | 1.22 |

PBM: Part by mass

Examples 24-27

Evaluation of Influence by Surfactant Addition

A photocatalyst-coated body having a photocatalyst layer was produced as follows. A colored organic coated body was prepared as a substrate. The colored organic coated body was obtained by coating a float plate glass with a general-purposed acrylic silicone with a carbon black powder added, and then sufficiently drying and curing it. On the other hand, a photocatalyst coating liquid was prepared by mixing a titania aqueous dispersions as a photocatalyst, an aqueous dispersion-type colloidal silica as an inorganic oxide, water as a solvent, and a polyether-modified silicone surfactant all together in the proportions shown in Table 5. It should be noted that the photocatalyst coating liquid does not comprise the hydrolyzable silicone. The total solid concentration of the photocatalyst and the inorganic oxide in the photocatalyst coating liquid was 5.5% by mass.

The photocatalyst coating liquid thus obtained was applied, by spray coating, to the colored organic coated body which has been previously heated to 50° C. to 60° C. The photocatalyst coating liquid was dried for 5 minutes at 120° C. In this way, a photocatalyst layer was formed to obtain a photocatalyst-coated body. When the film thickness (μm) of the photocatalyst layer was measured with a scanning electron microscope, the film thickness was about 1 μm in each of Examples 24 to 27.

A gas decomposition test was conducted on the photocatalyst-coated body thus obtained with the size of 50 mm×100 mm as described below. As a pretreatment, the photocatalyst-coated body was irradiated with BLB light at 1 mW/cm² for 12 hours or more. The coated body sample was placed in a reactor in accordance with JIS R1701. Air adjusted to 50% RH at 25° C. was mixed with NO gas to a level about 1000 ppb, and was introduced to the light-shielded reactor for 20 minutes. With the gas being introduced, the BLB light was applied at 3 mW/cm² for 20 minutes. The reactor was then shielded from light again in a condition where the gas is introduced. The amount of NOx removed was calculated from the NO concentrations and the $NO_2$ concentrations before and after the irradiation with the BLB light, in accordance with the following equation:

The amount of NOx removed=[NO (after BLB irradiation)–NO (at BLB irradiation)]–[$NO_2$ (at BLB irradiation)–$NO_2$ (after BLB irradiation)]

The results are shown in Table 5, in which the NOx removal efficiencies are shown relatively to the removal efficiency 100 in Example 25. As shown in Table 5, it has been found that increasing the amount of the surfactant leads to reduction in removal efficiency.

TABLE 5

| Ex. | Titanium oxide particles (PBM) | Silica particles (PBM) | Surfactant (PBM) | NOx removal efficiencies (Ex. 25 is 100) |
|---|---|---|---|---|
| 24 | 10 | 90 | 0 | 98 |
| 25 | 10 | 90 | 6 | 100 |
| 26* | 10 | 90 | 10 | 85 |
| 27* | 10 | 90 | 33.3 | 79 |

PBM: Part by mass.

Additional embodiments of the present invention involving a lower content of photocatalytic particles are discussed below, i.e., examples having 5 parts by mass or less of photocatalytic particles.

Photocatalytic Coating Liquid

The photocatalytic coating liquid according to the present invention is a coating liquid for forming the aforementioned photocatalyst-coated body and comprises a solvent, the photocatalytic particles having an average particle diameter of 10 nm or more and 100 nm or less in an amount of 1 part by mass or more and 5 parts by mass or less, the inorganic oxide particles in an amount of more than 85 parts by mass and 99 parts by mass or less, and the hydrolyzable silicone in an amount of 0 part by mass or more and less than 10 parts by mass in terms of silica, so that the total amount of the photocatalytic particles, the inorganic oxide particles and the hydrolyzable silicone in terms of silica is 100 parts by mass.

That is, when the photocatalytic layer is formed by applying and drying the photocatalytic coating liquid on the substrate, it is considered that considerably lower content of the photocatalytic particles than the inorganic oxide particles (specifically, more than 1 part by mass and less than 5 parts by mass, preferably 2 parts by mass or more and less than 5 parts by mass, more preferably 2 parts by mass or more and 4.5 part by mass or less relative to the total amount of 100 parts by mass of the photocatalytic particles, inorganic oxide particles and hydrolyzable silicone) enables to minimize the direct contact of the photocatalytic particles with the substrate, thereby resulting in low tendency of erosion of the substrate (especially the organic substrate). In addition, it is considered that deterioration of the substrate by ultraviolet light can be reduced by reducing the dose of the ultraviolet light reaching the substrate since the photocatalyst itself absorbs the ultraviolet light.

At the same time, by this construction, it becomes possible to obtain a photocatalyst-coated body excellent in harmful gas decomposability and various desired coating characteristics (such as transparency and film strength), while preventing erosion of the substrate (especially the organic substrate). First of all, the photocatalytic layer is basically composed of two types of particles, i.e., photocatalytic particles and inorganic oxide particles, resulting in the plentiful presence of interstices between the particles. If a large amount of hydrolyzable silicone which is commonly used as a binder of the photocatalytic layer is used, it is considered that the gas diffusion is hindered because such interstices between the particles are densely filled. However, since the photocatalytic layer of the present invention does not comprise the dried substance of the hydrolyzable silicone or, even if it comprises some, the content is less than 10 parts by mass relative to the total amount of 100 parts by mass of the photocatalytic particles, the inorganic oxide particles, and the dried substance of the hydrolyzable silicone in terms of silica, interstices between the particles can be sufficiently maintained and secured and facilitate diffusion of the harmful gases such as NOx and SOx into the photocatalytic layer. As a result, it is considered that the harmful gases effectively contact with the photocatalytic particles and are decomposed by the photocatalytic activity. Considering the aforementioned action and effect, it is the most preferable that the amount of the dried substance of the hydrolyzable silicone in terms of silica is virtually 0 part by mass.

In particular, in the aforementioned construction, the photocatalytic particles can exert photocatalytic decomposition function such as a function to decompose NOx in an amount as small as more than 1 part by mass and less than 5 parts by mass. Therefore, it is considered that a photocatalyst-coated body excellent in weather resistance, hydrophilicity, harmful gas decomposability and various desired coating characteristics (such as transparency and film strength) is realized, while preventing erosion of the substrate (especially the organic substrate). Accordingly, the photocatalytic layer of the present invention can exert excellent durability even with high ultraviolet dose and under hot and humid weather conditions in tropical and subtropical regions especially at low latitudes, at the same time as the photocatalytic decomposition function.

It is preferable that the average particle diameter of the photocatalytic particles in the photocatalytic coating liquid is 10 nm or more and 100 nm or less, more preferably 10 nm or more and 60 nm or less. The average particle diameter is calculated as a number average value of the measured length of arbitrary 100 particles within a visual field of a scanning electron microscope with 200,000× magnification. Although the most preferred shape of the particle is perfect sphere, approximate circle or ellipse may be acceptable, in which case the length of the particle is approximately calculated as ((major axis+minor axis)/2). In this range, gas permeation amount in the photocatalytic layer formed by applying and drying the photocatalytic coating liquid on the substrate, specific surface area for sufficient gas decomposition activity, monocrystalline size for sufficient photocatalytic activity of the particle, and various coating film characteristics such as transparency and weather resistance can be exerted in a balanced manner. Furthermore, making the average particle diameter of the photocatalytic particles 10 nm or more and 100 nm or less, more preferably 10 nm or more and 60 nm or less can be suitably combined with each of the constituent elements of the present invention described up to here, and new effects mentioned above may also be exerted without hindering the effects of the constituent elements.

As the photocatalytic particles, particles of metal oxide such as titanium oxide ($TiO_2$), ZnO, $SnO_2$, $SrTiO_3$, $WO_3$, $Bi_2O_3$, and $Fe_2O_3$ are exemplified. Any metal oxides exemplified here can be suitably combined with each constituent elements of the present invention described up to here.

As the photocatalytic particles in the photocatalytic coating liquid, titanium oxide particles are preferable. Titanium oxide has better water resistance compared with ZnO and exerts better photocatalytic function compared with $SnO_2$ such as gas decomposition by the light of the wavelength of 380 nm to 420 nm which is included sufficiently in sunlight. Furthermore, microparticles of a nanometer order of titanium oxide are more available than $SrTiO_3$, therefore the specific surface area is large and practically sufficient photocatalytic activity is attainable. Furthermore, due to its larger bandgap compared with $WO_3$, $Bi_2O_3$, and $Fe_2O_3$, titanium oxide has a sufficient oxidation power, prevents recoupling of conductive electron and positive hole after photoexcitation, and has activation energy sufficient for gas decomposition. In addition, titanium oxide is harmless, chemically stable, and available at low cost. In addition, due to its high bandgap energy, titanium oxide needs ultraviolet light for photoexcitation and does not absorb visible light in the process of photoexcitation, resulting in no coloration by complementary color component.

Titanium oxide is available in various forms such as powder, sol, solution, etc., and titaium oxide in any form may be added into the coating liquid as long as it shows photocatalytic activity after applying and drying on the substrate.

Using titanium oxide particles as the photocatalytic particles can be suitably combined with each of the constituent elements of the present invention described up to here, and new effects mentioned above may also be exerted without hindering the effects of the constituent elements.

As the photocatalytic particles in the photocatalytic coating liquid, anatase-type titanium oxide is preferable among titanium oxide particles. Anatase-type titanium oxide has an oxidation power stronger than rutile-type titanium oxide and exerts stronger photocatalytic function such as gas decomposition. Furthermore, using anatase-type titanium oxide particles as the photocatalytic particles can be suitably combined with each of the constituent elements of the present invention described up to here, and new effects mentioned above may also be exerted without hindering the effects of the constituent elements.

It is preferable that Cu component is further incorporated into the photocatalytic coating liquid. Cu itself has excellent antifungal characteristics and excellent adsorption characteristics for harmful gases and acts on the photocatalytic particles to decrease the probability of recoupling of conductive electron and positive hole generated by photoexcitation of the photocatalyst, resulting in increasing the oxidation power and gas decomposition power of the photocatalytic particles. Larger effect is exerted if the photocatalyst is a photocatalyst having intrinsically strong oxidation power, such as titanium oxide, especially anatase-type titanium oxide.

Incorporating Cu component into the photocatalytic coating liquid can be suitably combined with each of the constituent elements of the present invention described up to here, and new effects mentioned above may also be exerted without hindering the effects of the constituent elements.

It is preferable that Cu component is supported on the photocatalytic particles in the photocatalytic coating liquid. Not only simply incorporating the Cu component but also making the Cu component positively supported on the photocatalytic particles can act on the photocatalytic particles to decrease the probability of recoupling of conductive electron and positive hole generated by photoexcitation of the photocatalyst and thus increase the oxidation power of the photocatalytic particles, further facilitating the effect of increasing gas decomposition power. Larger effect is exerted if the photocatalyst is a photocatalyst having intrinsically strong oxidation power, such as titanium oxide, especially anatase-type titanium oxide. Furthermore, making Cu positively supported on the photocatalytic particles can be suitably combined with each of the constituent elements of the present invention described up to here, and new effects mentioned above may also be exerted without hindering the effects of the constituent elements.

It is preferable that both of the Cu component and the Ag component are both incorporated into the photocatalytic coating liquid. Incorporating both of Cu and Ag into the photocatalytic coating liquid not only exerts the excellent antifungal characteristics of Cu and excellent antibacterial characteristics of Ag simultaneously, but substantially increases the decomposition activity of the photocatalyst. Although the mechanism is not clear at present, mutual interactions among the photocatalytic particles, Ag, and Cu are presumably correlated. Larger effect is exerted if the photocatalyst is a photocatalyst having intrinsically strong oxidation power, such as titanium oxide, especially anatase-type titanium oxide. Furthermore, incorporating both of the Cu component and the Ag component into the photocatalytic coating liquid can be suitably combined with each of the constituent elements of the present invention described up to here, and new effects mentioned above may also be exerted without hindering the effects of the constituent elements.

It is preferable that both of the Cu component and the Ag component are supported on the photocatalytic particles in the photocatalytic coating liquid. Not only making Cu and Ag present in the photocatalytic coating liquid but also making Cu and Ag positively supported on the photocatalytic particles can act on the photocatalytic particles to decrease the probability of recoupling of conductive electron and positive hole generated by photoexcitation of the photocatalyst and thus increase the oxidation power of the photocatalytic particles, further facilitating the effect of increasing gas decomposition power. Larger effect is exerted if the photocatalyst is a photocatalyst having intrinsically strong oxidation power, such as titanium oxide, especially anatase-type titanium oxide. Furthermore, making both of Cu and Ag positively supported on the photocatalytic particles can be further suitably combined with each of the constituent elements of the present invention described up to here, and new effects mentioned above may also be exerted without hindering the effects of the constituent elements.

As the inorganic oxide particles in the photocatalytic coating liquid, for example, particles of single oxide such as silica, alumina, zirconia, ceria, yttria, boronia, magnesia, calcia, ferrite, iron oxide, amorphous titania, hafnia, tin oxide, manganese oxide, niobium oxide, nickel oxide, cobalt oxide, indium oxide, lanthanum oxide, barium oxide, etc.; or complex oxide such as aluminosilicate, barium titanate, calcium silicate, etc. can be suitably used. These inorganic oxide particles are preferably added in the form of an aqueous colloid in water as a dispersant or an organosol dispersed in a form of colloid in a hydrophilic solvent such as ethyl alcohol, isopropyl alcohol, or ethylene glycol and the like.

It is considered that mixing the inorganic oxide particles in the photocatalytic coating liquid can moderately decrease the amount of the photocatalyst and minimize the direct contact of the photocatalytic particles with the substrate, while securing the gas permeability in the photocatalytic layer obtained by applying and drying the photocatalytic coating liquid, thereby preventing the erosion of the substrate (especially the organic substrate). In addition, it is considered that deterioration of the substrate by ultraviolet light can be reduced by reducing the dose of the ultraviolet light reaching the substrate since the photocatalyst itself absorbs the ultraviolet light.

As the inorganic oxide particles in the photocatalytic coating liquid, silica is the most preferable. Incorporating silica increases the hydrophilicity of the photocatalytic layer, which is washed by water or rainwater, resulting in effectively preventing the stain adhered to the surface from decreasing the decomposition function of the photocatalyst. This preventive effect is especially enhanced if the photocatalyst is a photocatalyst having intrinsically strong oxidation power, such as titanium oxide, especially anatase-type titanium oxide. The silica particles are preferably in the form of an aqueous colloid in water as a dispersant or an organosol dispersed in a form of colloid in a hydrophilic solvent such as ethyl alcohol, isopropyl alcohol, or ethylene glycol and the like, especially preferably being colloidal silica. Furthermore, using silica particles as the inorganic oxide particles can be suitably combined with each of the constituent elements of the present invention described up to here, and new effects mentioned above may also be exerted without hindering the effects of the constituent elements.

As for the inorganic oxide particles in the photocatalytic coating liquid, the number average particle diameter calculated by the measurement of the length of arbitrary 100 particles within a visual field of a scanning electron microscope with 200,000× magnification is preferably 5 nm or more and less than 40 nm, more preferably more than 5 nm and 20 nm or less.

Using the inorganic oxide particles with the average particle diameter of less than 40 nm, more preferably 20 nm or less, improves the gas permeability, the gas decomposition reactivity and the abrasion resistance in the photocatalytic layer obtained by applying and drying the photocatalytic coating liquid on the substrate Furthermore, making the inorganic oxide particles in the photocatalytic coating liquid have a number average particle diameter of 5 nm or more and less than 40 nm, more preferably more than 5 nm and 20 nm or less, can be suitably combined with each of the constituent elements of the present invention described up to here, and new effects mentioned above may also be exerted without hindering the effects of the constituent elements.

The photocatalytic coating liquid may comprise a surfactant as an optional component. The surfactant used in the present invention may be comprised in the photocatalytic layer as an optional component in an amount of 0 part by mass or more and less than 10 parts by mass, preferably 0 part by mass or more and 8 parts by mass or less, more preferably 0 or more and 6 parts by mass or less, relative to the total amount of 100 parts by mass of the photocatalytic particles, the inorganic oxide particles, and the hydrolyzable silicone. One of the effects of the surfactant is leveling property to the substrate. In the case where the leveling effect is necessary, such as coating in a large area, amount of the surfactant may be determined in the aforementioned range as needed depending on the combination of the coating liquid and the substrate. The lower limit in this case is preferably 0.1 part by mass relative to the total amount of 100 parts by mass of the photocatalytic particles, the inorganic oxide particles, and the hydrolyzable silicone. Although the surfactant is an effective component to improve the wettability of the photocatalytic coating liquid, it is equivalent to the inevitable impurity which no longer contributes to the effect of the photocatalyst-coated body of the present invention in the photocatalytic layer formed after applying and drying. Therefore, the upper limit should be less than 10 parts by mass, preferably less than 8 parts by mass, more preferably 6 parts by mass or less, relative to the total amount of 100 parts of the photocatalytic particles, inorganic oxide particles, and the hydrolyzable silicone. That is, the surfactant may be used in the aforementioned range of the content depending on the wettability required for the photocatalytic coating liquid. It is most preferable that the surfactant is virtually or definitely not comprised for the application where the wettability is not required. The surfactant to be used may be selected from nonionic surfactant, anionic surfactant, cationic surfactant, and amphoteric surfactant as needed considering the dispersion stability of the photocatalyst and the inorganic oxide particles and the wettability when applied on the intermediate layer. Among these a nonionic surfactant is especially preferable, among which more preferable are ether-type nonionic surfactant, ester-type nonionic surfactant, polyalkylene glycol-type nonionic surfactant, fluorine-type nonionic surfactant, and silicone-based nonionic surfactant.

Furthermore, as for the surfactant used in the coating liquid of the present invention, making the surfactant comprised in the photocatalytic layer as an optional component in an amount of 0 part by mass or more and less than 10 parts by mass, preferably 0 part by mass or more and 8 parts by mass or less, more preferably 0 or more and 6 parts by mass or less, relative to the total amount of 100 parts by mass of the photocatalytic particles, the inorganic oxide particles, and the hydrolyzable silicone can be suitably combined with each of the constituent elements of the present invention described up to here, and new effects mentioned above may also be exerted without hindering the effects of the constituent elements.

The photocatalytic coating liquid may further comprise a hydrolyzed condensation-polymerization product of titanium alkoxide or a derivative of titanium alkoxide as an optional component in an amount of 0 part by mass or more and less than 10 parts by mass, preferably 0 part by mass or more and less than 8 parts by mass, more preferably less than 6 parts by mass, in terms of titanium dioxide.

If the photocatalytic coating liquid comprises the hydrolyzed condensation-polymerization product of titanium alkoxide or the derivative of titanium alkoxide in an amount as small as less than 10 parts by mass, preferably less than 8 parts by mass, more preferably less than 6 parts by mass, in terms of titanium dioxide, abrasion resistance slightly increases and curing of the photocatalytic layer may be expected in shorter time after coating compared with the hydrolyzable silicone. However, it is preferable that the interstices between the particles of the photocatalytic layer are sufficiently maintained in order to take advantage of the photocatalytic gas decomposition characteristics of the present invention such as the excellent ability to decompose NOx. If the hydrolyzed condensation-polymerization product of titanium alkoxide or the derivative of titanium alkoxide is used in an amount as large as 10 parts by mass or more in terms of titanium dioxide, it is considered that such interstices between the particles are densely filled to prevent the diffusion of gases, similarly to the case where a hydrolyzable silicone commonly used as a binder for the photocatalytic layer is used in a large amount. On the other hand, since the photocatalytic coating liquid of the present embodiment does not comprise the hydrolyzed condensation-polymerization product of titanium alkoxide or the derivative of titanium alkoxide or, even if it comprises some, the amount is less than 10 parts by mass relative to the total amount of 100 parts by mass of the photocatalytic particles, the inorganic oxide particles, and the dried substance of titanium alkoxide in terms of titanium dioxide, it is considered to be possible to maintain and secure interstices between the particles, which attain a structure where the harmful gases such as NOx and SOx are easily diffused into the photocatalytic layer. As a result, it is considered that the harmful gases effectively contact with the photocatalytic particles and are decomposed by the photocatalytic activity.

Considering the aforementioned action and effect, as a more preferred construction in the present embodiment, it is preferable that the sum of the amount of the hydrolyzed condensation-polymerization product of titanium alkoxide or the derivative of titanium alkoxide in terms of titanium dioxide and the amount of the dried substance of the hydrolyzable silicone in terms of silica is 0 part by mass or more and less than 10 parts by mass, preferably 0 part by mass or more and less than 8 parts by mass, more preferably 0 part by mass or more and less than 6 parts by mass. It is the most preferable that the amount of the hydrolyzed condensation-polymerization product of titanium alkoxide or the derivative of titanium alkoxide in terms of titanium dioxide is virtually 0 part by mass.

In addition, making the photocatalytic coating liquid further comprise the hydrolyzed condensation-polymerization product of titanium alkoxide or the derivative of titanium alkoxide as an optional component in an amount of 0 part by mass or more and less than 10 parts by mass, preferably 0 part by mass or more and less than 8 parts by mass, more preferably less than 6 parts by mass in terms of titanium dioxide; making the sum of the amount of the hydrolyzed condensation-polymerization product of titanium alkoxide or the derivative of titanium alkoxide in terms of titanium dioxide and the amount of the dried substance of the hydrolyzable silicone in terms of silica 0 part by mass or more and less than 10 parts by mass, preferably 0 part by mass or more and less than 8 parts by mass, more preferably 0 part by mass or more and less than 6 parts by mass; and making the amount of the hydrolyzed condensation-polymerization product of titanium alkoxide or the derivative of titanium alkoxide in terms of titanium dioxide virtually 0 part by mass can be suitably combined with each of the constituent elements of the present invention described up to here, and new effects mentioned above may also be exerted without hindering the effects of the constituent elements.

It is preferable that the hydrolyzable silicone, which is an optional component in the photocatalytic coating liquid, is an organosiloxane having at least one reactive group selected from the group consisting of alkoxy group, halogen group, and hydrogen group.

Since these hydrolyzable silicones, after applying to the substrate, harden by dehydrative condensation-polymerization by drying at ambient temperature or heat treatment at 10° C. or higher and 500° C. or lower to give a rigid dried substance of the hydrolyzable silicone, so that the abrasion resistance can be increased.

As the hydrolyzable silicone, a silicone having a reactive group at its end which is obtained by polymerizing a bifunctional silane, trifunctional silane, or tetrafunctional silane as its monomer unit singly or in combination (oligomer and polymer) can be advantageously used. Among these, a silicate obtained by polymerizing a tetrafunctional silane unit ($SiX_4$, X is at least one reactive group selected from the group consisting of alkoxy group, halogen group, or hydrogen group) only (hereinafter referred to as tetrafunctional silicone) is the most preferable. Using the tetrafunctional silicone is preferable because the hydrophilicity of the photocatalytic layer is good and self-cleaning property is exerted at the same time. As the tetrafunctional silicone, an alkyl silicate such as methyl silicate, ethyl silicate, and isopropyl silicate can be advantageously used.

In addition, making the hydrolyzable silicone, which is an optional component in the photocatalytic coating liquid, an organosiloxane having at least one reactive group selected from the group consisting of alkoxy group, halogen group, and hydrogen group; using the silicone (oligomer and polymer) having a reactive group at its end which is preferably obtained by polymerizing a bifunctional silane, trifunctional silane, or tetrafunctional silane as its monomer unit singly or in combination as the hydrolyzable silicone; and more preferably using the tetrafunctional silicone can be suitably combined with each of the constituent elements of the present invention described up to here, and new effects mentioned above may also be exerted without hindering the effects of the constituent elements.

It is more preferable that the hydrolyzable silicone, which is an optional component in the photocatalytic coating liquid, is an organosiloxane having an alkoxy group. The organosiloxane having an alkoxy group makes it easier to control dehydrative condensation-polymerization reaction, compared with the organosiloxane having a halogen or hydrogen group, and to form a photocatalytic layer with a stable quality.

In addition, making the hydrolyzable silicone, which is an optional component in the photocatalytic coating liquid, the organosiloxane having an alkoxy group can be suitably combined with each of the constituent elements of the present invention described up to here, and new effects mentioned above may also be exerted without hindering the effects of the constituent elements.

Furthermore, at least one metal selected from a group consisting of vanadium, iron, cobalt, nickel, manganese, palladium, zinc, ruthenium, rhodium, platinum and gold and/or a metal compound the metal may be added into the photocatalytic coating liquid. In this way, the catalytic functions of these metals may be exerted simultaneously. The addition can be performed by any method such as mixing and dissolving or dispersing the metal or metal compound to the coating liquid, or making the metal or metal compound supported on the photocatalytic layer or photocatalytic particles.

As a solvent in the photocatalytic coating liquid, both of water and organic solvent may be used, water being preferable. In this way, the coating film can be formed without volatilization of the organic solvent at coating, which is preferable from the standpoint of environment. In addition, although the solid concentration of the photocatalytic coating liquid of the present invention is not particularly limited, 1 to 10% by mass is preferable because of easiness of coating. In addition, the constituent of the photocatalytic coating composition can be analyzed by separating the coating liquid into the particle component and the filtrate by ultrafiltration, followed by individual analysis by infrared spectroscopic analysis, gel permeation chromatography, fluorescent X-ray spectroscopy, etc. and analysis of the spectrum.

In addition, using water as the solvent for the photocatalytic coating liquid; and making the solid concentration of the photocatalytic coating liquid 1 to 10% by mass can be suitably combined with each of the constituent elements of the present invention described up to here and can exert new effects mentioned above without hindering the effects of the constituent elements.

Among the aforementioned photocatalyst-coated bodies, the coating liquid for forming the intermediate layer to form the photocatalyst-coated body provided with the intermediate layer preferably comprises a solvent and a silicone-modified resin, more preferably a solvent and an acrylic silicone.

In this way, the weather resistance, durability against the photocatalytic reaction, flexibility and the like of the intermediate layer can be sufficiently exerted.

As the silicone-modified resin, a silicone-modified acrylic resin, a silicone-modified epoxy resin, a silicone-modified urethane resin, a silicone-modified polyester, etc. which include polysiloxane in the resin are more preferable from the point of weather resistance.

It is preferable that the silicone-modified resin comprises silicon atom in an amount of 0.2% by mass or more and less than 16.5% by mass, more preferably 6.5% by mass or more and less than 16.5% by mass relative to the solid content of the silicone-modified resin. If the silicon atom content comprised in the silicone-modified resin is 0.2% by mass or more, the weather resistance of the intermediate layer is good and the possibility of erosion by the photocatalyst is suppressed. If the silicon atom content comprised in the silicone-modified resin is less than 16.5% by mass, sufficient flexibility is attained and occurrence of cracks in the intermediate layer is suppressed. The silicon atom content in the aforementioned silicone-modified resin can be measured by the chemical analysis using an X-ray photoelectron spectroscopic analyzer (XPS).

In addition, it is more preferable that two fluids of the silicone-modified acrylic resin having a carboxyl group and the silicone resin having an epoxy group are mixed and used as the acrylic silicone, from a point of increasing the strength of the coated film.

In addition, making the intermediate layer comprise the silicone-modified resin; making the silicone-modified resin comprise silicon atom in an amount of 0.2% by mass or more and less than 16.5% by mass, more preferably 6.5% by mass or more and less than 16.5% by mass; making the intermediate layer comprise the acrylic silicone; and mixing and using two fluids of the silicone-modified acrylic resin having a carboxyl group and the silicone resin having an epoxy group as the acrylic silicone can be suitably combined with each of the constituent elements of the present invention described up to here and can exert new effects mentioned above without hindering the effects of the constituent elements.

In addition, making the coating liquid for forming the intermediate layer comprise the solvent and the silicone-modified resin; and making the coating liquid for forming the intermediate layer comprise the solvent and the acrylic silicone can be suitably combined with each of the constituent elements of the present invention described up to here and can exert new effects mentioned above without hindering the effects of the constituent elements.

Among the aforementioned photocatalyst-coated bodies, the coating liquid for forming the intermediate layer to form the photocatalyst-coated body provided with the intermediate layer preferably comprises an ultraviolet absorption agent. In this way, the weather resistance and the durability against the photocatalytic reaction of the substrate can be further increased.

In addition, making the coating liquid for forming the intermediate layer comprise the ultraviolet absorption agent can be suitably combined with each of the constituent elements of the present invention described up to here and can exert new effects mentioned above without hindering the effects of the constituent elements.

Among the aforementioned photocatalyst-coated bodies, the coating liquid for forming the intermediate layer to form the photocatalyst-coated body provided with the intermediate layer preferably comprises an organic antifungal agent. In virtue of the organic antifungal agent comprised in the intermediate layer different from the photocatalytic layer as well as the interstices provided between the particles of the photocatalytic layer, the antialgal and antifungal function of the photocatalyst and the antialgal and antifungal function of the organic antifungal agent can be effectively exerted without mutual deterioration.

In addition, making the coating liquid for forming the intermediate layer comprise the antifungal agent can be suitably combined with each of the constituent elements of the present invention described up to here and can exert new effects mentioned above without hindering the effects of the constituent elements.

As a solvent in the coating liquid for forming the intermediate layer, both of water and organic solvent may be used, water being preferable. In this way, the coating film can be formed without volatilization of the organic solvent at coating, which is preferable from the standpoint of environment.

In addition, although the solid concentration of the liquid agent for coating the intermediate layer of the present invention is not particularly limited, 10 to 20% by mass is preferable because of easiness of coating. In addition, the constituent of the coating liquid for the intermediate layer can be analyzed by infrared spectroscopic analysis regarding the resin components.

In addition, using water as the solvent for the coating liquid for forming the intermediate layer; and making the solid concentration of the liquid agent for coating the intermediate layer of the present invention preferably 10 to 20% by mass can be suitably combined with each of the constituent elements of the present invention described up to here and can exert new effects mentioned above without hindering the effects of the constituent elements.

Method for Producing the Photocatalytic Layer

The photocatalyst-coated body of the present invention can be easily produced by applying the photocatalytic coating liquid of the present invention on the substrate. As the application method of the photocatalytic layer, commonly and widely performed methods such as brushing, roller coating, spraying, a roll coater, a flow coater, dip coating, flow coating, screen printing, etc. can be used. After applying the coating liquid on the substrate, it may be dried at ambient temperature or by heating as needed. If the coated body is heated until sintering is advanced, the interstices between the particles are decreased, resulting in insufficient photocatalytic activity. In the present invention, the drying temperature is 10° C. or higher and 500° C. or lower. The upper limit may be determined as needed depending on the type of the substrate. If a resin is comprised in at least a part of the substrate, the preferred drying temperature is 10° C. or higher and 200° C. or lower, considering the allowable temperature limit of the resin, etc.

Method for Producing the Intermediate Layer

The intermediate layer coated body of the present invention can be easily produced by applying the intermediate layer coating liquid of the present invention on the substrate. As the application method of the intermediate layer, commonly and widely performed methods such as brushing, roller coating, spraying, a roll coater, a flow coater, dip coating, flow coating, screen printing, electrocoating, vapor deposition, etc. can be used. After applying the coating liquid on the substrate, it may be dried at ambient temperature or by heating as needed.

Examples

Example A

The present invention is specifically illustrated based on the following examples. The present invention is not limited to these examples.

The raw materials used for the preparation of the photocatalytic coating liquid in the following examples are as follows:

Photocatalytic Particles
Titania water dispersion (Average particle diameter: 42 nm, basic)
Inorganic Oxide Particles
Water dispersed colloidal silica (Average particle diameter: 14 nm, basic) (Used in Examples 101 to 107, Example 109, and Examples 111 to 123)
Water dispersed colloidal silica (Average particle diameter: 26 nm, basic) (Used in Example 8)
Water dispersed colloidal silica (Average particle diameter: 5 nm, basic) (Used in Example 110)
Hydrolyzable Silicone
Polycondensation product of tetramethoxysilane (Concentration as converted to $SiO_2$: 51% by mass, Solvent: methanol and water)
Surfactant
Polyether modified silicone type surfactant

Examples 101 to 103

Evaluation of Weather Resistance (Outdoor Exposure)

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a sealer-treated siding substrate for ceramics industry, followed by sufficient drying and curing. Meanwhile, the titania water dispersion as the photocatalyst, the water dispersed colloidal silica as the inorganic oxide, water as the solvent, and the surfactant were mixed in the compounding ratio shown in Table 6 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation was about 0.5 μm for any of Examples 101 to 103.

The photocatalyst-coated body of the size of 50×100 mm thus obtained was subjected to outdoor exposure at the elevation angle of 20° and facing south using an exposure rack defined in JIS K 5600-7-6 in Miyakojima Island. The external appearance was confirmed by visual observation every three months.

The results obtained are shown in Table 6. "G" in the Table represents little change and "NG" represents occurrence of slight efflorescence. As shown in Table 6, it was found that sufficient weather resistance can be attained by making the photocatalytic layer comprise less than 5 parts by mass of the photocatalytic particles, even if the organic substrate is painted with the photocatalytic layer in Miyakojima Island.

TABLE 6

| | Titanium oxide particles (parts by mass) | Silica particles (parts by mass) | Surface-active agent (parts by mass) | Appearance change | | |
|---|---|---|---|---|---|---|
| | | | | 3 months | 6 months | 12 months |
| Example 101 | 4.5 | 95.5 | 6 | G | G | G |
| Example 102 | 10 | 90 | 6 | G | NG | NG |
| Example 103 | 20 | 80 | 6 | NG | NG | NG |

Examples 104 to 106

Evaluation of Hydrophilicity after Ultraviolet Exposure

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a float plate glass, followed by sufficient drying and curing. Meanwhile, the titania water dispersion as the photocatalyst, the water dispersed colloidal silica as the inorganic oxide having various average particle diameters shown in Table 7, water as the solvent, and the surfactant were mixed in the compounding ratio shown in Table 7 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation was about 0.5 μm for any of Examples 104 to 106.

The hydrophilicity was evaluated for the photocatalyst-coated body thus obtained as follows. The photocatalyst-coated body was cured in a dark place for 1 day and allowed to stand under the BLB light adjusted at 1 mW/cm² with the photocatalyst painted surface upward for 7 days. The contact angle of the photocatalyst painted surface was measured by a contact angle meter (CA-X150 Type manufactured by Kyowa Interface Science Co., Ltd.). The measurement of the contact angle was to substitute hydrophilicity.

The results obtained are shown in Table 7. The evaluation criteria of the hydrophilicity after ultraviolet exposure are as follows.

[Hydrophilicity]

A: Contact angle less than 10°

B: Contact angle 10° or more and less than 20°

C: Contact angle 20° or more

As shown in Table 7, it was found that the high hydrophilicity was secured by using the photocatalytic layer comprising 2 parts by mass or more of the photocatalytic particles.

TABLE 7

| | Titanium oxide particles (parts by mass) | Silica particles (parts by mass) | Surface-active agent (parts by mass) | Hydrophilicity |
|---|---|---|---|---|
| Example 104 | 2 | 98 | 6 | B |
| Example 105 | 4.5 | 95.5 | 6 | A |
| Example 106 | 1 | 99 | 6 | C |

TABLE 8

| | Titanium oxide particle (parts by mass) | Silica particle (parts by mass) | Silica particle average particle diameter (nm) | Surface-active agent (parts by mass) | Sliding abrasion resistance |
|---|---|---|---|---|---|
| Example 107 | 4.5 | 95.5 | 14 | 6 | A |
| Example 108 | 4.5 | 95.5 | 26 | 6 | B |

Examples 107 and 108

Evaluation of Sliding Abrasion Resistance

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a slate board treated with an epoxy resin for sealing, followed by sufficient drying and curing. Meanwhile, the titania water dispersion as the photocatalyst, the water dispersed colloidal silica as the inorganic oxide having various average particle diameters shown in Table 8, water as the solvent, and the surfactant were mixed in the compounding ratio shown in Table 8 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation was about 0.5 μm for any of Examples 107 to 108.

The washing resistance test for the photocatalyst-coated body thus obtained was performed as follows. The test method was according to JIS A6909. The photocatalyst-coated body was horizontally fixed on a test rack of a washability apparatus (Washability Tester No. 458 manufactured by Toyo Seiki Seisaku-sho, Ltd.) with the photocatalyst painted surface facing upward. A pig bristle brush of a dry weight of 450 g was put on the photocatalyst painted surface after the bristles were immersed in an aqueous soap solution of 0.5% and reciprocated 500 times. Then the photocatalyst-coated body was removed, washed with water and dried.

After irradiating the thoroughly dried photocatalyst-coated body with BLB light adjusted at 3 mW/cm$^2$ for 24 hours, the contact angle of the photocatalyst-painted surface was measured by a contact angle meter (CA-X150 Type manufactured by Kyowa Interface Science Co., Ltd.). The measurement of the contact angle was to substitute hydrophilicity.

The results obtained are shown in Table 8. The evaluation criteria of the sliding abrasion resistance are as follows.

[Sliding Abrasion Resistance]

A: Contact angle less than 10°

B: Contact angle 10° or more

As shown in Table 8, it was found that the photocatalyst-coated body of Example 107 formed a strong film against sliding.

Examples 109 and 110

Measurement of Haze

The photocatalyst-coated body comprising the photocatalytic layer was produced as follows. First, a float plate glass having transmittance of 94% at the wavelength of 550 nm was used as the substrate. Meanwhile, the titania water dispersion as the photocatalyst, the water dispersed colloidal silica as the inorganic oxide having various average particle diameters shown in Table 9, water as the solvent, and the surfactant were mixed in the compounding ratio shown in Table 9 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned substrate was spin coated by the photocatalytic coating liquid obtained at 1000 rpm for 10 seconds, followed by drying at 120° C. to obtain the photocatalytic layer. Haze of the photocatalyst-coated body of the size of 50×100 mm thus obtained was measured using a haze meter (Haze-Gard Plus manufactured by Paul N. Gardner Company, Inc.).

The results obtained are shown in Table 9. It was found that the photocatalyst-coated body of Example 109 suppressed the haze to less than 1% and the transparency was secured.

TABLE 9

| | Titanium oxide particle (parts by mass) | Silica particle (parts by mass) | Silica particle average particle diameter (nm) | Surface-active agent (parts by mass) | Haze (%) |
|---|---|---|---|---|---|
| Example 109 | 4.5 | 95.5 | 14 | 6 | 0.62 |
| Example 110 | 4.5 | 95.5 | 5 | 6 | 1.25 |

Examples 111 to 114

Evaluation of Harmful Gas Decomposition Activity

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a float plate glass, followed by sufficient drying and curing. Meanwhile, the titania water dispersion as the photocatalyst, the water dispersed colloidal silica as the inorganic oxide, the water dispersed colloidal silica as the inorganic oxide having various average particle diameters shown in Table 10, water as the solvent, and the surfactant were mixed in the compounding ratio shown in Table 10 to obtain the photocatalytic coating liquid. Therefore, the photocatalytic coating liquid does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation is shown in Table 10.

The gas decomposition activity test of thus obtained photocatalyst-coated body of size the 50×100 mm was performed as follows. The photocatalyst-coated body was irradiated with BLB light of 1 mW/cm$^2$ for 12 hours or more as pretreatment. One sample of the coated body was set in a reaction vessel described in JIS R1701. Air adjusted at 25° C. and 50% RH and mixed with NO gas so that the concentration of the NO was about 1,000 ppb was introduced into the light-shielded reaction vessel for 20 minutes. Then the sample was irradiated with BLB light adjusted at 3 mW/cm$^2$ with the introduced gas present. Then the reaction vessel was light shielded again with the introduced gas present. The NOx removal was calculated from the concentrations of NO and NO$_2$ before and after BLB light irradiation according to the following equation.

NOx Removal=[NO (after irradiation)−NO (at irradiation)]−[NO$_2$ (at irradiation)−NO$_2$ (after irradiation)]

The results obtained are shown in Table 10. As shown in Table 10, it was found that the sufficient NOx decomposition activity was attained even if the content of the photocatalytic particles in the photocatalytic layer was less than 5 parts by mass.

TABLE 10

| | Titanium oxide particle (parts by mass) | Silica particle (parts by mass) | Surface-active agent (parts by mass) | Film thickness (μm) | NO$x$ removal (Example 14 = 100) |
|---|---|---|---|---|---|
| Example 111 | 4.5 | 95.5 | 6 | 0.5 | 53 |
| Example 112 | 4.5 | 95.5 | 6 | 1 | 98 |
| Example 113 | 2 | 98 | 6 | 1.5 | 57 |
| Example 114 | 10 | 90 | 6 | 1 | 100 |

Examples 115 to 117

Influence of Hydrolyzable Silicone

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a float plate glass, followed by sufficient drying and curing. Meanwhile, the titania water dispersion as the photocatalyst, the water dispersed colloidal silica as the inorganic oxide, water as the solvent, a polycondensation product of tetramethoxysilane as the hydrolyzable silicone, and the surfactant were mixed in the compounding ratio shown in Table 11 to obtain the photocatalytic coating liquid. The photocatalytic coating liquid of Example 115 does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation was about 0.5 μm for any of Examples 115 to 117.

The gas decomposition activity of thus obtained photocatalyst-coated body of size the 50×100 mm was performed as follows. The photocatalyst-coated body was irradiated with BLB light of 1 mW/cm$^2$ for 12 hours or more as pretreatment. One sample of the coated body was set in a reaction vessel described in JIS R1701. Air adjusted at 25° C. and 50% RH and mixed with NO gas so that the concentration of the NO was about 1,000 ppb was introduced into the light-shielded reaction vessel for 20 minutes. Then the sample was irradiated with BLB light adjusted at 3 mW/cm$^2$ with the introduced gas present. Then the reaction vessel was light shielded again with the introduced gas present. The NOx removal was calculated from the concentrations of NO and NO$_2$ before and after BLB light irradiation according to the following equation.

NOx Removal=[NO (after irradiation)−NO (at irradiation)]−[NO$_2$ (at irradiation)−NO$_2$ (after irradiation)]

The results obtained are shown in Table 11. NOx removal in Example 115, in which the hydrolyzable silicone was not comprised at all, is taken as 100. Other examples of 50 or more and less than 50, relative to Example 115, are expressed as G and NG, respectively. As shown in Table 11, the photocatalytic layer composed of the photocatalytic particles and the inorganic oxides and comprising essentially no hydrolyzable silicone exhibited an excellent NOx decomposition activity. On the other hand, it was found that the sample comprising 10 parts by mass of the hydrolyzable silicone lost the NOx decomposition activity.

TABLE 11

| | Titanium oxide particles (parts by mass) | Silica particles (parts by mass) | Hydrolyzable silicone (parts by mass) | Surface-active agent (parts by mass) | NO$x$ removal (Example 15 = 100) |
|---|---|---|---|---|---|
| Example 115 | 4.5 | 95.5 | 0 | 6 | G (100) |
| Example 116 | 4.5 | 90.5 | 5 | 6 | G (84) |
| Example 117 | 4.5 | 85.5 | 10 | 6 | NG (41) |

Examples 118 and 119

Weather Resistance Test (Evaluation of Substrate Deterioration)

The photocatalyst-coated body comprising the photocatalytic layer was produced as follows. First, a colored organic coated body was prepared as the substrate. This colored organic coated body had been prepared by applying a general-purpose acrylic silicone containing carbon black powder on a float plate glass, followed by sufficient drying and curing. Meanwhile, the titania water dispersion as the photocatalyst, the water dispersed colloidal silica as the inorganic oxide, water as the solvent, and the surfactant were mixed in the compounding ratio shown in Table 12 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned colored organic coated body which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation was about 0.5 μm for any of Examples 118 and 119.

The weather resistance test for the photocatalyst-coated body of the size of 50×100 mm thus obtained was performed as follows. The photocatalyst-coated body was put into a xenon arc weather resistance testing apparatus combined with hydrogen peroxide spray (Ci4000 manufactured by Toyo Seiki Seisaku-sho Ltd.). Intensity of the xenon arc was 80 W/m$^2$ (wavelength 300 to 400 nm). Concentration of hydrogen peroxide was 1%. Irradiation with the xenon lamp was performed at 22 hours per cycle. Spraying of hydrogen peroxide was performed repeatedly in a cycle of 3 minutes spraying and 2 minutes stopping during the initial 2 hours. After 200 hours the sample was taken out and a cellophane tape was adhered on the painted surface followed by peeling off at once. The weather resistance was evaluated by the presence or absence of the powder of the colored organic coating adhered to the glue surface of the tape due to the deterioration of the coated film (chalking phenomenon).

The results obtained are shown in Table 12. "G" in the Table represents that very little powder adhered to the glue surface of the tape. As shown in Table 12, it was found that the photocatalyst-coated body comprising less than 5 parts by mass of the photocatalytic particles in the photocatalytic layer has a sufficient weather resistance.

TABLE 12

| | Titanium oxide particle (parts by mass) | Silica particle (parts by mass) | Surface-active agent (parts by mass) | Presence or absence of deterioration of the coated film |
|---|---|---|---|---|
| Example 118 | 2 | 98 | 6 | G |
| Example 119 | 4.5 | 95.5 | 6 | G |

Examples 120 to 123

Measurement of Linear Transmittance

The photocatalyst-coated body comprising the photocatalytic layer was produced as follows. First, a float plate glass having transmittance of 94% at the wavelength of 550 nm was prepared as the substrate. Meanwhile, the titania water dispersion as the photocatalyst, the water dispersed colloidal silica as the inorganic oxide, water as the solvent, and the surfactant were mixed in the compounding ratio shown in Table 13 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned float plate glass which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation is shown in Table 13.

The measurement of linear (550 nm) transmittance for the photocatalyst-coated body of the size of 50×100 mm thus obtained was performed using an ultraviolet-visible-near infrared spectrophotometer (UV-3150 manufactured by Shimadzu Corporation).

The results obtained are shown in Table 13. The evaluation criteria of the linear transmittance are as follows.

[Linear Transmittance]
A: Linear (550 nm) transmittance 95% or more
B: Linear (550 nm) transmittance 90% or more and less than 95%

The photocatalyst-coated bodies in Table 13 showed high transparency.

TABLE 13

| | Titanium oxide particle (parts by mass) | Silica particle (parts by mass) | Surface-active agent (parts by mass) | Film thickness (micrometer) | Linear transmittance (550 nm) |
|---|---|---|---|---|---|
| Example 120 | 4.5 | 95.5 | 6 | 0.5 | B |
| Example 121 | 4.5 | 95.5 | 6 | 1.5 | B |
| Example 122 | 2 | 98 | 6 | 0.5 | A |
| Example 123 | 2 | 98 | 6 | 1.5 | B |

Example B

The present invention is specifically illustrated based on the following examples. The present invention is not limited to these examples.

In the following examples, the intermediate layer coating liquid was prepared by mixing any one of the silicone-modified acrylic resin materials shown below, water and a film-forming auxiliary agent as needed. Details are shown in Table 14.

A silicone-modified acrylic resin dispersion with silicon atom content of 10% by mass relative to the solid content of the silicone-modified resin A silicone-modified acrylic resin dispersion with silicon atom content of 0.2% by mass relative to the solid content of the silicone-modified resin A silicone-modified acrylic resin dispersion with silicon atom content of 16.5% by mass relative to the solid content of the silicone-modified resin

TABLE 14

| | Silicon atom content in the silicone-modified acrylic resin (% by mass) |
|---|---|
| M-1 | 10 |
| M-2 | 0.2 |
| M-3 | 16.5 |

In the following examples, the photocatalytic layer coating liquid was prepared by mixing the photocatalytic particles shown below, any one of the inorganic oxides and water as needed. Details are shown in Table 15.

Photocatalytic Particles
Titania water dispersion (Average particle diameter: 42 nm, basic)
Inorganic Oxide Particles
Water dispersed colloidal silica (Average particle diameter: 14 nm, basic)
Water dispersed colloidal silica (Average particle diameter: 26 nm, basic)
Water dispersed colloidal silica (Average particle diameter: 5 nm, basic)
Hydrolyzable Silicone
Polycondensation product of tetramethoxysilane (concentration in terms of $SiO_2$: 51% by mass, Solvent: methanol and water)
Surfactant
Polyether modified silicone-based surfactant

TABLE 15

|  | Photocatalyst content (parts by mass) | Colloidal silica content (parts by mass) | Colloidal silica average particle diameter (nm) | Surface-active agent (parts by mass) | Hydrolyzable silicate content in terms of $SiO_2$ (parts by mass) |
| --- | --- | --- | --- | --- | --- |
| T-1 | 4.5 | 95.5 | 14 | 6 | 0 |
| T-2 | 10 | 90 | 14 | 6 | 0 |
| T-3 | 20 | 80 | 14 | 6 | 0 |
| T-4 | 30 | 70 | 14 | 6 | 0 |
| T-5 | 2 | 98 | 14 | 6 | 0 |
| T-6 | 1 | 99 | 14 | 6 | 0 |
| T-7 | 4.5 | 95.5 | 26 | 6 | 0 |
| T-8 | 4.5 | 95.5 | 5 | 6 | 0 |
| T-9 | 4.5 | 90.5 | 14 | 6 | 5 |
| T-10 | 4.5 | 85.5 | 14 | 6 | 10 |

Examples 131 to 133

Evaluation of Weather Resistance (Outdoor Exposure)

The photocatalyst-coated body comprising the intermediate layer and the photocatalytic layer was produced as follows. First, a float plate glass was prepared as the substrate. The preheated glass substrate was spray-coated with the intermediate layer coating liquid described in M-1 of Table 14 and dried at 120° C. to obtain the intermediate layer. The solid concentration of the resin in the M-1 solution was about 20%. The film thickness of the intermediate layer measured by scanning electron microscopic observation was about 10 μm for any of Examples 131 to 133.

Meanwhile, the titania water dispersion as the photocatalyst, the water dispersed colloidal silica as the inorganic oxide, water as the solvent, and the surfactant were mixed in the compounding ratio shown in T-1 to T-3 of Table 15 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 μm for any of Examples 131 to 133. In this way, the intermediate layer and the photocatalytic layer were formed to obtain the photocatalyst-coated body.

The photocatalyst-coated body of the size of 50×100 nm thus obtained was subjected to outdoor exposure at the elevation angle of 20° and facing south using an exposure rack defined in JIS K 5600-7-6 in Miyakojima Island. The external appearance was confirmed by visual observation every three months.

The results obtained are shown in Table 16. "G" in the Table represents little change and "NG" represents occurrence of slight efflorescence. As shown in Table 16, it was found that sufficient weather resistance is attained in Miyakojima Island by using the photocatalytic layer comprising less than 5 parts by mass of the photocatalyst.

TABLE 16

|  | Intermediate Layer | Photocatalytic Layer | Appearance Change | |
| --- | --- | --- | --- | --- |
|  |  |  | 3 months | 6 months |
| Example 131 | M-1 | T-1 | G | G |
| Example 132 | M-1 | T-2 | G | NG |
| Example 133 | M-1 | T-3 | NG | NG |

Examples 134 to 136

Evaluation of Hydrophilicity after Ultraviolet Exposure

The photocatalyst-coated body comprising the intermediate layer and the photocatalytic layer was produced as follows. First, a float plate glass was prepared as the substrate. The preheated glass substrate was spray-coated with the intermediate layer coating liquid described in M-1 of Table 14 and dried at 120° C. to obtain the intermediate layer. The solid concentration of the resin in the M-1 solution was about 20%. The film thickness of the intermediate layer measured by scanning electron microscopic observation was about 10 μm for any of Examples 134 to 136.

Meanwhile, the titania water dispersion as the photocatalyst, the water dispersed colloidal silica as the inorganic oxide, water as the solvent, and the surfactant were mixed in the compounding ratio shown in T-1, T-5 and T-6 of Table 15 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 μm for any of Examples 134 to 136. In this way, the intermediate layer and the photocatalytic layer were formed to obtain the photocatalyst-coated body.

The hydrophilicity was evaluated for the photocatalyst-coated body thus obtained as follows. The photocatalyst-coated body was cured in a dark place for 1 day and allowed to stand under the BLB light adjusted at 1 mW/cm$^2$ with the photocatalyst painted surface facing upward for 7 days. The contact angle of the photocatalyst painted surface was measured by a contact angle meter (CA-X150 Type manufactured by Kyowa Interface Science Co., Ltd.). The measurement of the contact angle was to substitute hydrophilicity.

The results obtained are shown in Table 17. The evaluation criteria of the hydrophilicity after ultraviolet exposure are as follows.
Hydrophilicity
A: Contact angle less than 10°
B: Contact angle 10° or more and less than 20°
C: Contact angle 20° or more As shown in Table 17, it was found that the high hydrophilicity was secured by using the photocatalytic layer comprising 2 parts by mass or more of the photocatalytic particles.

TABLE 17

|  | Intermediate layer | Photocatalytic layer | Hydrophilicity |
|---|---|---|---|
| Example 134 | M-1 | T-5 | B |
| Example 135 | M-1 | T-1 | A |
| Example 136 | M-1 | T-6 | C |

Examples 137 and 138

Evaluation of Sliding Abrasion Resistance

The photocatalyst-coated body comprising the intermediate layer and the photocatalytic layer was produced as follows. First, a float plate glass was prepared as the substrate. The preheated glass substrate was spray-coated with the intermediate layer coating liquid described in M-1 of Table 14 and dried at 120° C. to obtain the intermediate layer. The solid concentration of the resin in the M-1 solution was about 20%. The film thickness of the intermediate layer measured by scanning electron microscopic observation was about 10 μm for any of Examples 137 and 138.

Meanwhile, the titania water dispersion as the photocatalyst, the water dispersed colloidal silica as the inorganic oxide, water as the solvent, and the surfactant were mixed in the compounding ratio shown in T-1 and T-7 of Table 15 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 μm for any of Examples 137 and 138. In this way, the intermediate layer and the photocatalytic layer were formed to obtain the photocatalyst-coated body.

The washing resistance test for the photocatalyst-coated body thus obtained was performed as follows. The test method was according to JIS A6909. The photocatalyst-coated body was horizontally fixed on a test rack of a washability apparatus (Washability Tester No. 458 manufactured by Toyo Seiki Seisaku-sho, Ltd.) with the photocatalyst painted surface facing upward. A pig bristle brush of a dry weight of 450 g was put on the photocatalyst painted surface after the bristles were immersed in an aqueous soap solution of 0.5% and reciprocated 500 times. Then the photocatalytic painted body was removed, washed with water and dried.

After irradiating the thoroughly dried photocatalyst-coated body with BLB light adjusted at 3 mW/cm$^2$ for 24 hours, the contact angle of the photocatalyst painted surface was measured by a contact angle meter (CA-X150 Type manufactured by Kyowa Interface Science Co., Ltd.). The measurement of the contact angle was to substitute hydrophilicity.

The results obtained are shown in Table 18. The evaluation criteria of the sliding abrasion resistance are as follows.
Sliding Abrasion Resistance
A: Contact angle less than 10°
B: Contact angle 10° or more As shown in Table 18, it was found that the photocatalyst-coated body of Example 137 formed a strong film against sliding.

TABLE 18

|  | Intermediate layer | Photocatalytic layer | Sliding abrasion resistance |
|---|---|---|---|
| Example 137 | M-1 | T-1 | A |
| Example 138 | M-1 | T-7 | B |

Examples 139 and 140

Measurement of Haze

The photocatalyst-coated body comprising the photocatalytic layer was produced as follows. First, a float plate glass having transmittance of 94% at the wavelength of 550 nm was used as the substrate. Meanwhile, the titania water dispersion as the photocatalyst, the water dispersed colloidal silica as the inorganic oxide, water as the solvent, and the surfactant were mixed in the compounding ratio shown in T-1 and T-8 of Table 15 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass.

The aforementioned substrate was spin coated by the photocatalytic coating liquid obtained at 1000 rpm for 10 seconds, followed by drying at 120° C. to obtain the photocatalytic layer. Haze of the photocatalyst-coated body of the size of 50×100 mm thus obtained was measured using a haze meter (Haze-Gard Plus manufactured by Paul N. Gardner Company, Inc.).

The results obtained are shown in Table 19. It was found that the photocatalyst-coated body of Example 139 was suppressed the haze to less than 1% and the transparency was secured.

TABLE 19

|  | Photocatalytic layer | Silica particle average particle diameter (nm) | Haze (%) |
|---|---|---|---|
| Example 139 | T-1 | 14 | 0.62 |
| Example 140 | T-8 | 5 | 1.25 |

Examples 141 to 144

Evaluation of Harmful Gas Decomposition Activity

The photocatalyst-coated body comprising the intermediate layer and the photocatalytic layer was produced as follows. First, a float plate glass was prepared as the substrate. The preheated glass substrate was spray-coated with the intermediate layer coating liquid described in M-1 of Table 14 and dried at 120° C. to obtain the intermediate layer. The solid concentration of the resin in the M-1 solution was about 20%. The film thickness of the intermediate layer measured by scanning electron microscopic observation was about 10 μm for any of Examples 141 to 144.

Meanwhile, the titania water dispersion as the photocatalyst, the water dispersed colloidal silica as the inorganic oxide, water as the solvent, and the surfactant were mixed in the compounding ratio shown in T-1, T-2 and T-5 of Table 15 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation is shown in Table 20. In this way, the intermediate layer and the photocatalytic layer were formed to obtain the photocatalyst-coated body.

The gas decomposition activity test of thus obtained photocatalyst-coated body of size the 50×100 mm was performed as follows. The photocatalyst-coated body was irradiated with BLB light of 1 mW/cm² for 12 hours or more as pretreatment. One sample of the coated body was set in a reaction vessel described in JIS R1701. Air adjusted at 25° C. and 50% RH and mixed with NO gas so that the concentration of the NO was about 1,000 ppb was introduced into the light-shielded reaction vessel for 20 minutes. Then the sample was irradiated with BLB light adjusted at 3 mW/cm² with the introduced gas present. Then the reaction vessel was light shielded again with the introduced gas present. The NOx removal was calculated from the concentrations of NO and NO₂ before and after BLB light irradiation according to the following equation.

NOx Removal=[NO (after irradiation)−NO (at irradiation)]−[NO₂ (at irradiation)−NO₂ (after irradiation)]

The results obtained are shown in Table 20. As shown in Table 20, it was found that the sufficient NOx decomposition activity was attained even if the content of the photocatalytic particles in the photocatalytic layer was less than 5 parts by mass.

TABLE 20

| | Intermediate layer | Photocatalytic layer | Film thickness (μm) | NOx removal (Example 14 = 100) |
|---|---|---|---|---|
| Example 141 | M-1 | T-1 | 0.5 | 51 |
| Example 142 | M-1 | T-1 | 1 | 97 |
| Example 143 | M-1 | T-5 | 1.5 | 56 |
| Example 144 | M-1 | T-2 | 0.5 | 100 |

Examples 145 to 147

Influence of Hydrolyzable Silicone

The photocatalyst-coated body comprising the intermediate layer and the photocatalytic layer was produced as follows. First, a float plate glass was prepared as the substrate. The preheated glass substrate was spray-coated with the intermediate layer coating liquid described in M-1 of Table 14 and dried at 120° C. to obtain the intermediate layer. The solid concentration of the resin in the M-1 solution was about 20%. The film thickness of the intermediate layer measured by scanning electron microscopic observation was about 10 μm for any of Examples 145 to 147.

Meanwhile, the titania water dispersion as the photocatalyst, the water dispersed colloidal silica as the inorganic oxide, water as the solvent, and the surfactant were mixed in the compounding ratio shown in T-1, T-9 and T-10 of Table 15 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 μm for any of Examples 145 to 147. In this way, the intermediate layer and the photocatalytic layer were formed to obtain the photocatalyst-coated body.

The gas decomposition activity test of thus obtained photocatalyst-coated body of size the 50×100 mm was performed as follows. The photocatalyst-coated body was irradiated with BLB light of 1 mW/cm² for 12 hours or more as pretreatment. One sample of the coated body was set in a reaction vessel described in JIS R1701. Air adjusted at 25° C. and 50% RH and mixed with NO gas so that the concentration of the NO was about 1,000 ppb was introduced into the light-shielded reaction vessel for 20 minutes. Then the sample was irradiated with BLB light adjusted at 3 mW/cm² with the introduced gas present. Then the reaction vessel was light shielded again with the introduced gas present. The NOx removal was calculated from the concentrations of NO and NO₂ before and after BLB light irradiation according to the following equation.

NOx Removal=[NO (after irradiation)−NO (at irradiation)]−[NO₂ (at irradiation)−NO₂ (after irradiation)]

The results obtained are shown in Table 21. NOx removal in Example 145, in which the hydrolyzable silicone was not comprised at all, is taken as 100. Other examples of 50 or more and less than 50, relative to Example 145, are expressed as G and NG, respectively. As shown in Table 21, the photocatalytic layer composed of the photocatalytic particles and the inorganic oxides and comprising essentially no hydrolyzable silicone exhibited an excellent NOx decomposition activity. On the other hand, it was found that the sample comprising 10 parts by mass of the hydrolyzable silicone lost the NOx decomposition activity.

TABLE 21

| | Intermediate layer | Photocatalytic layer | Hydrolyzed silicate content converted to SiO₂ (parts by mass) | Nox removal (Example 15 = 100) |
|---|---|---|---|---|
| Example 145 | M-1 | T-1 | 0 | G (100) |
| Example 146 | M-1 | T-9 | 5 | G (85) |
| Example 147 | M-1 | T-10 | 10 | NG (40) |

Examples 148 to 151

Measurement of Linear Transmittance

The photocatalyst-coated body comprising the photocatalytic layer was produced as follows. First, a float plate glass having transmittance of 94% at the wavelength of 550 nm was prepared as the substrate. Meanwhile, the titania water dispersion as the photocatalyst, the water dispersed colloidal silica as the inorganic oxide, water as the solvent, and the surfactant were mixed in the compounding ratio shown in T-1 and T-5 of Table 15 to obtain the photocatalytic coating liquid. Therefore, the photocatalytic coating liquid does not comprise the hydrolyzable silicone. The total solid concentration of the photocatalyst and the inorganic oxide in the photocatalytic coating liquid was 5.5% by mass.

The aforementioned float plate glass which had been heated beforehand was spray-coated with the photocatalytic coating liquid and was dried at 120° C. In this way, the photocatalytic layer was formed to obtain the photocatalyst-coated body. The film thickness of the photocatalytic layer measured by scanning electron microscopic observation is shown in Table 22.

The measurement of linear (550 nm) transmittance for the photocatalyst-coated body of the size of 50×100 mm thus obtained was performed using an ultraviolet-visible-near infrared spectrophotometer (UV-3150 manufactured by Shimadzu Corporation).

The results obtained are shown in Table 22. The evaluation criteria of the linear transmittance are as follows.

Linear Transmittance
A: Linear (550 nm) transmittance 95% or more
B: Linear (550 nm) transmittance 90% or more and less than 95%

The photocatalyst-coated bodies in Table 22 showed high transparency.

TABLE 22

|  | Photocatalytic Layer | Film Thickness (μm) | Linear Transmittance (550 nm) |
|---|---|---|---|
| Example 148 | T-1 | 0.5 | B |
| Example 149 | T-1 | 1.5 | B |
| Example 150 | T-5 | 0.5 | A |
| Example 151 | T-5 | 1.5 | B |

Examples 152 to 154

Evaluation of Weather Resistance of Painted Film-1

The photocatalyst-coated body comprising the intermediate layer and the photocatalytic layer was produced as follows. First, a float plate glass was prepared as the substrate. The preheated glass substrate was spray-coated with the mixture of the intermediate layer coating liquid described in M-2 of Table 14 and a colored pigment and dried at 120° C. to obtain the intermediate layer. The solid concentration of the resin in the M-2 solution was about 20%. The film thickness of the intermediate layer measured by scanning electron microscopic observation was about 10 μm for any of Examples 152 to 154.

Meanwhile, the titania water dispersion as the photocatalyst, the water dispersed colloidal silica as the inorganic oxide, and water as the solvent were mixed in the compounding ratio shown in T-1, T-4 and T-5 of Table 15 to obtain the photocatalytic coating liquid. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 μm for any of Examples 152 to 154. In this way, the intermediate layer and the photocatalytic layer were formed to obtain the photocatalyst-coated body.

The weather resistance test for the photocatalyst-coated body of the size of 50×100 mm thus obtained was performed as follows. The photocatalyst-coated body was put into a sunshine weatherometer (S-300C manufactured by Suga Test Instruments Co., Ltd.) defined in JIS B7753. The sample was taken out after 300 hours and the color difference before and after the acceleration test was measured using a color difference meter ZE2000 manufactured by Nippon Denshoku Industries Co., Ltd. The degree of discoloration was evaluated by comparing the Δb values.

The results obtained are shown in Table 23. "G" in the table represents little discoloration and "NG" represents that the Δb value transited to plus side (yellowing side). As shown in Table 23, it was found that the photocatalyst-coated bodies of Examples 152 and 153 have sufficient weather resistance even if the intermediate layer comprising a small amount of silicon atom is painted with the photocatalytic layer.

TABLE 23

|  | Intermediate layer | Photocatalytic layer | Photocatalyst content in photocatalytic layer (parts by mass) | Δb |
|---|---|---|---|---|
| Example 152 | M-2 | T-1 | 4.5 | G |
| Example 153 | M-2 | T-5 | 2 | G |
| Example 154 | M-2 | T-4 | 30 | NG |

Example 155 and 156

Evaluation of Weather Resistance of Painted Film-2

The photocatalyst-coated body comprising the intermediate layer and the photocatalytic layer was produced as follows. First, a zinc-plated steel sheet painted with a general-purpose epoxy resin primer and dried was prepared as the substrate. The substrate was spray-coated with the intermediate layer coating liquid described in M-1 and M-3 of Table 14 and dried at 120° C. to obtain the intermediate layer. The solid concentration of the resin in the M-1 and M-2 solutions was about 20%. The film thickness of the intermediate layer measured by scanning electron microscopic observation was about 10 μm for any of Examples 155 using M-1 and Example 156 using M-3.

Meanwhile, the titania water dispersion as the photocatalyst, the water dispersed colloidal silica as the inorganic oxide, water as the solvent, and the surfactant were mixed in the compounding ratio shown in T-1 of Table 15 to obtain the photocatalytic coating liquid. The photocatalytic coating liquid does not comprise the hydrolyzable silicone. The total solid concentration of the photocatalyst and the inorganic oxide in the photocatalytic coating liquid was 5.5% by mass. The preheated intermediate layer coated body was spray-coated with the photocatalytic coating liquid and was dried at 120° C. The film thickness of the photocatalytic layer measured by scanning electron microscopic observation was about 0.5 μm for any of Examples 55 and 56. In this way, the intermediate layer and the photocatalytic layer were formed to obtain the photocatalyst-coated body.

The weather resistance test for the photocatalyst-coated body of the size of 50×100 mm thus obtained was performed as follows. The photocatalyst-coated body was put into a metaling weatherometer (M6T manufactured by Suga Test Instruments Co., Ltd.) and the external appearance was confirmed after 150 hours.

In Example 155 in which the acrylic modified silicone resin comprising 10% by mass of silicon atom was used, cracks did not occur and good weather resistance was attained. On the other hand, in Example 156 in which the acrylic modified silicone resin comprising 16.5% by mass of silicon atom was used, partial occurrence of cracks was observed albeit only slightly.

The invention claimed is:

1. A photocatalyst-coated body comprising a substrate and a photocatalyst layer provided on the substrate, the photocatalyst layer comprising:
   photocatalyst particles of 1 part or more by mass and less than 20 parts by mass;
   inorganic oxide particles of 70 parts or more by mass and less than 99 parts by mass; and
   the dried substance of a hydrolyzable silicone in terms of silica of zero parts or more by mass and less than 10 parts by mass, provided that a total amount of the photocatalyst particles, the inorganic oxide particles and the hydrolysable silicone in terms of silica is 100 parts by mass,
   wherein the inorganic oxide particles have a number average particle diameter ranging from 10 nm or more to less than 40 nm calculated by measuring lengths of 100 particles randomly selected from particles located within a visible field magnified 200,000 times by a scanning electron microscope.

2. The photocatalyst-coated body according to claim 1, wherein the photocatalyst layer has a film thickness ranging from 0.5 μm to 3.0 μm.

3. The photocatalyst-coated body according to claim 1, wherein the photocatalyst layer is substantially free from the hydrolyzable silicone.

4. The photocatalyst-coated body according to claim 1, wherein the photocatalyst layer further comprises a surfactant of zero parts or more by mass and less than 10 parts by mass.

5. The photocatalyst-coated body according to claim 1, wherein the photocatalyst layer comprises the photocatalyst particles of 5 parts to 15 parts by mass.

6. The photocatalyst-coated body according to claim 1, wherein the photocatalyst particles are titanium oxide particles.

7. The photocatalyst-coated body according to claim 1, wherein the inorganic oxide particles are silica particles.

8. The photocatalyst-coated body according to claim 1, wherein the photocatalyst layer is applied directly on the substrate.

9. The photocatalyst-coated body according to claim 1, wherein the photocatalyst-coated body is used as an exterior material.

10. A photocatalyst coating liquid used for manufacturing the photocatalyst-coated body according to claim 1, comprising, in a solvent,
    photocatalyst particles of 1 part or more by mass and less than 20 parts by mass;
    inorganic oxide particles of 70 parts or more by mass and less than 99 parts by mass; and
    a hydrolyzable silicone in terms of silica of zero parts or more by mass and less than 10 parts by mass, provided that the total amount of the photocatalyst particles, the inorganic oxide particles and the hydrolysable silicone in terms of silica is 100 parts by mass,
    wherein the inorganic oxide particles have a number average particle diameter ranging from 10 nm or more to less than 40 nm calculated by measuring lengths of 100 particles randomly selected from particles located within a visible field magnified 200,000 times by a scanning electron microscope, and
    wherein the photocatalyst particles are titanium oxide particles.

11. The photocatalyst coating liquid according to claim 10, which comprises substantially none of the hydrolyzable silicone.

12. The photocatalyst coating liquid according to claim 10, further comprising a surfactant of zero parts or more by mass and less than 10 parts by mass.

13. The photocatalyst coating liquid according to claim 10, comprises the photocatalyst particles of 5 parts to 15 parts by mass.

14. The photocatalyst coating liquid according to claim 10, wherein the inorganic oxide particles are silica particles.

15. The photocatalyst coating liquid according to claim 10, wherein the photocatalyst coating liquid is adapted to be applied for coating to a substrate having at least a surface comprising an organic material.

16. The photocatalyst coating liquid according to claim 15, wherein the photocatalyst coating liquid is adapted to be applied directly on the substrate.

17. The photocatalyst coating liquid according to claim 10, wherein the photocatalyst coating liquid is adapted to be applied as a coating on a material which is exposed to an outdoor environment.

* * * * *